US008123655B2

(12) United States Patent
Endo

(10) Patent No.: US 8,123,655 B2
(45) Date of Patent: Feb. 28, 2012

(54) POWER OUTPUT APPARATUS, DRIVE SYSTEM, AND CONTROL METHOD OF POWER OUTPUT APPARATUS

(75) Inventor: Hiroatsu Endo, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1149 days.

(21) Appl. No.: 11/918,351

(22) PCT Filed: May 10, 2006

(86) PCT No.: PCT/JP2006/309764
§ 371 (c)(1),
(2), (4) Date: Oct. 12, 2007

(87) PCT Pub. No.: WO2006/121184
PCT Pub. Date: Nov. 16, 2006

(65) Prior Publication Data
US 2008/0318730 A1   Dec. 25, 2008

(30) Foreign Application Priority Data

May 10, 2005   (JP) .................................. 2005-137691

(51) Int. Cl.
*B60W 10/02* (2006.01)
(52) U.S. Cl. ........................................... 477/5; 477/180
(58) Field of Classification Search .................. 477/3–6, 477/180, 143, 145, 150; 701/59–61, 67–68
See application file for complete search history.

(56) References Cited

U.S. PATENT DOCUMENTS 5,903,061 A * 5/1999 Tsuzuki et al. ............. 290/40 C
5,951,614 A * 9/1999 Tabata et al. ................. 701/54
6,595,895 B2 * 7/2003 Suzuki et al. ................. 477/3
6,629,027 B2 * 9/2003 Yamaguchi et al. ........... 701/22
(Continued)

FOREIGN PATENT DOCUMENTS

DE   196 32 855 A1   2/1997
(Continued)

*Primary Examiner* — Justin Holmes
*Assistant Examiner* — Huan Le
(74) *Attorney, Agent, or Firm* — Oliff & Berridge, PLC

(57) ABSTRACT

The technique of the invention is applied to a motor vehicle where an engine and a first motor are linked to a driveshaft via a planetary gear mechanism, a second motor is linked to the driveshaft via a transmission, and a battery is arranged to receive and transmit electric power from and to the first motor and the second motor. In response to a deviation of the charge-discharge state of the battery from an allowable control range set as an allowable charge state range of the battery during an upshift, gear change control of the invention sets a gearshift condition change flag F1 to 1 (step S360) and sets a value N2 having a smaller absolute value than a value N1 to a target rotation speed change ΔNm2* of the second motor (step S380). The gear change control then sets a hydraulic pressure command Pb1* of a brake B1 included in the transmission to make an actual rotation speed change ΔNm2 of the second motor approach to the target rotation speed change ΔNm2* (step S400). This arrangement reduces a rate of change in rotation speed Nm2 of the second motor. The reduced rate of change in rotation speed Nm2 prevents a continuous decrease or a continuous increase in power consumption of the second motor that is caused by, for example, delayed detection, delayed computation, and delayed communication, thus effectively protecting the battery from excessive power input and excessive power output.

23 Claims, 15 Drawing Sheets

U.S. PATENT DOCUMENTS

| | | |
|---|---|---|
| 7,097,586 B2 * | 8/2006 | Joe et al. ............... 477/3 |
| 7,434,641 B2 * | 10/2008 | Takami et al. ........... 180/65.25 |
| 2002/0062183 A1 * | 5/2002 | Yamaguchi et al. ........... 701/22 |

FOREIGN PATENT DOCUMENTS

| | | |
|---|---|---|
| JP | A-2001-153218 | 6/2001 |
| JP | A-2003-291691 | 10/2003 |
| JP | A-2004-176641 | 6/2004 |
| JP | A-2004-208421 | 6/2004 |
| JP | A-2004-203219 | 7/2004 |
| JP | A-2004-204960 | 7/2004 |
| JP | A-2005-028968 | 2/2005 |
| JP | A-2005-096574 | 4/2005 |
| JP | A-2006-248466 | 9/2006 |

* cited by examiner

POWER OUTPUT APPARATUS, DRIVE SYSTEM, AND CONTROL METHOD OF POWER OUTPUT APPARATUS

TECHNICAL FIELD

The present invention relates to a power output apparatus, a motor vehicle equipped with the power output apparatus, a drive system including the power output apparatus, and a control method of the power output apparatus.

BACKGROUND ART

In one proposed structure of a power output apparatus, an engine and a first motor generator are connected to an output shaft via a planetary gear mechanism, a second motor generator is connected to the output shaft via a transmission, and a battery is arranged to receive and transmit electric power from and to the first motor generator and the second motor generator (see, for example, Japanese Patent Laid-Open Gazette No. 2004-204960). This proposed power output apparatus adequately corrects and updates an output torque of the second motor generator to compensate for a decrease in output torque to the output shaft during a changeover of a gear ratio in the transmission.

DISCLOSURE OF THE INVENTION

The prior art power output apparatus prevents a significant decrease in output torque to the output shaft during a changeover of the gear ratio in the transmission, but does not take into account the input and output of electric power into and from the battery. A variation in power consumption of the second motor generator due to, for example, delayed detection of a rotation speed of the second motor generator by a sensor may cause excessive power input into or excessive power output from the battery.

The power output apparatus of the invention, the motor vehicle equipped with the power output apparatus, the drive system including the power output apparatus, and the control method of the power output apparatus thus aim to protect an accumulator unit from excessive power input and excessive power output. The power output apparatus of the invention, the motor vehicle equipped with the power output apparatus, the drive system including the power output apparatus, and the control method of the power output apparatus also aim to regulate a rate of change in rotation speed of a motor during a changeover of a gear ratio in a transmission according to the state of a hydraulic pressure supply to a clutch.

At least part of the above and the other related objects is attained by a power output apparatus, a motor vehicle equipped with the power output apparatus, a drive system including the power output apparatus, and a control method of the power output apparatus of the invention having the configurations discussed below.

The present invention is directed to a power output apparatus that outputs power to a driveshaft. The power output apparatus includes: a power generation structure that receives a supply of fuel to generate electric power; a motor that inputs and outputs power; a change speed transmission mechanism that is arranged between a rotating shaft of the motor and the driveshaft to convert an input power with a changeover of a gear ratio and to transmit the converted power; an accumulator unit that transmits electric power to and from the power generation structure and the motor; a charge-discharge state detection unit that detects a charge-discharge state of the accumulator unit; a power demand setting unit that sets a power demand required for the driveshaft; and a control module that controls the power generation structure, the motor, and the change speed transmission mechanism during a changeover of the gear ratio of the change speed transmission mechanism to ensure output of a power substantially equivalent to the power demand to the driveshaft and to vary a changeover state of the gear ratio of the change speed transmission mechanism with a view to, in the event of a deviation of the detected charge-discharge state of the accumulator unit out of an allowable control range set as an allowed charge state range of the accumulator unit, making the charge-discharge state of the accumulator unit enter the allowable control range.

The power output apparatus of the invention controls the power generation structure, the motor, and the change speed transmission mechanism during a changeover of the gear ratio of the change speed transmission mechanism to ensure output of a power substantially equivalent to the required power demand to the driveshaft and to vary the changeover state of the gear ratio of the change speed transmission mechanism. The varied changeover state of the gear ratio aims, in the event of a deviation of the detected charge-discharge state of the accumulator unit out of the allowable control range set as the allowed charge state range of the accumulator unit, to make the charge-discharge state of the accumulator unit enter the allowable control range. The power output apparatus of the invention accomplishes a changeover of the gear ratio of the change speed transmission mechanism, while keeping the charge-discharge state of the accumulator unit within the allowable control range. This arrangement effectively protects the accumulator unit from excessive power input and excessive power output.

In one preferable embodiment of the power output apparatus of the invention, when the detected charge-discharge state of the accumulator unit is within the allowable control range, the control module varies a rotation speed of the motor at a first rate of change and accordingly changes over the gear ratio of the change speed transmission mechanism. When the detected charge-discharge state of the accumulator unit is out of the allowable control range, the control module varies the rotation speed of the motor at a second rate of change, which is lower than the first rate of change, and accordingly changes over the gear ratio of the change speed transmission mechanism. In the event of a deviation of the charge-discharge state of the accumulator unit out of the allowable control range, the power output apparatus of this preferable embodiment reduces the rate of change in rotation speed of the motor, thus effectively protecting the accumulator unit from excessive power input and excessive power output.

In one application of the power output apparatus of this preferable embodiment, the change speed transmission mechanism changes an engagement state of at least one hydraulic-driven clutch to change over the gear ratio. In the event of a deviation of the detected charge-discharge state of the accumulator unit out of the allowable control range, the control module regulates a state of a hydraulic pressure supply to the clutch and accordingly varies the changeover state of the gear ratio of the change speed transmission mechanism. The changeover state of the gear ratio of the change speed transmission mechanism can thus be varied adequately by regulating the state of the hydraulic pressure supply to the clutch. Here the terminology 'clutch' includes a conventional clutch for interconnecting two rotation systems, as well as a brake for fixing one rotation system to a non-rotation system, such as casing. In this application, in the event of a deviation of the detected charge-discharge state of the accumulator unit out of the allowable control range, the control module may regulate the state of the hydraulic pressure supply to the clutch based on the rotation speed of the motor to set the second rate of change to the rate of change of the rotation speed of the motor. This arrangement ensures the appropriate regulation of the rate of change in rotation speed of the motor.

In one preferable application of the power output apparatus of the invention, when the detected charge-discharge state of the accumulator unit is deviated from the allowable control range and then reenters the allowable control range, the control module returns the changeover state of the gear ratio of the change speed transmission mechanism to a previous changeover state after completion of a current changeover of the gear ratio of the change speed transmission mechanism. This arrangement desirably reduces the potential shock caused by the returned changeover state during a changeover of the gear ratio of the change speed transmission mechanism. In another preferable application of the power output apparatus of the invention, in the event of a deviation of the detected charge-discharge state of the accumulator unit out of the allowable control range, the control module varies the changeover state of the gear ratio of the change speed transmission mechanism at start of a next changeover of the gear ratio of the change speed transmission mechanism after completion of a current changeover of the gear ratio of the change speed transmission mechanism. This arrangement desirably reduces the potential shock caused by the varied changeover state during a changeover of the gear ratio of the change speed transmission mechanism.

In one preferable embodiment of the power output apparatus of the invention, in the event of a deviation of the detected charge-discharge state of the accumulator unit out of the allowable control range, the control module sets a condition of varying the changeover state of the gear ratio of the change speed transmission mechanism based on the charge-discharge state of the accumulator unit. The changeover state of the gear ratio of the change speed transmission mechanism can thus be varied adequately according to the charge-discharge state of the accumulator unit. In another preferable embodiment of the power output apparatus of the invention, the charge-discharge state detection unit detects the charge-discharge state of the accumulator unit, based on at least one of a voltage applied between output terminals of the accumulator unit and a flow of electric current supplied between the output terminals of the accumulator unit. This arrangement enables the detection of the charge-discharge state of the accumulator unit with higher accuracy.

In one preferable structure of the power output apparatus of the invention, the control module controls the power generation structure, the motor, and the change speed transmission mechanism during a changeover of the gear ratio of the change speed transmission mechanism to decrease the rotation speed of the motor. This arrangement effectively protects the accumulator unit from excessive power input. In another preferable structure of the power output apparatus of the invention, the control module controls the power generation structure, the motor, and the change speed transmission mechanism during a changeover of the gear ratio of the change speed transmission mechanism to increase the rotation speed of the motor. This arrangement effectively protects the accumulator unit from excessive power output.

In one preferable embodiment of the invention, the power output apparatus further includes a learning module that learns a variation in rotation speed of the motor at a timing of a changeover of the gear ratio of the change speed transmission mechanism. The control module refers to a result of the learning by the learning module and changes over the gear ratio of the change speed transmission mechanism based on the learning result. This arrangement ensures the adequate changeover of the gear ratio of the change speed transmission mechanism. The learning module may learn, for example, a rate of change in rotation speed of the motor or, in a structure with a hydraulic-driven clutch, an engagement state of the clutch or a state of a hydraulic pressure supply to the clutch, as the variation in rotation speed of the motor.

In another preferable embodiment of the power output apparatus of the invention, in the event of a deviation of the detected charge-discharge state of the accumulator unit out of the allowable control range, the control module varies the changeover state of the gear ratio of the change speed transmission mechanism according to an amount of power generation by the power generation structure. The changeover state of the gear ratio of the change speed transmission mechanism can thus be varied adequately according to the amount of power generation by the power generation structure.

In still another preferable embodiment of the power output apparatus of the invention, the power generation structure includes: an internal combustion engine that is driven to output power; and an electric power-mechanical power input output mechanism that is connected with an output shaft of the internal combustion engine and with the driveshaft and outputs at least part of the power of the internal combustion engine to the driveshaft through input and output of electric power and mechanical power. In this case, the electric power-mechanical power input output mechanism includes: a three shaft-type power input output module that is linked to three shafts, the output shaft of the internal combustion engine, the driveshaft, and a rotating shaft, and automatically inputs and outputs power from and to a residual one shaft based on powers input from and output to any two shafts among the three shafts; and a generator that inputs and outputs power from and to the rotating shaft. Further, the electric power-mechanical power input output mechanism includes a pair-rotor motor that has a first rotor connected to the output shaft of the internal combustion engine and a second rotor connected to the driveshaft and is driven to rotate through relative rotation of the first rotor to the second rotor. In still another preferable embodiment of the power output apparatus of the invention, the power generation structure includes fuel cells.

Another application of the invention is a motor vehicle equipped with the power output apparatus having any of the arrangements discussed above. Namely the invention is also directed to a motor vehicle that is equipped with a power output apparatus for outputting power to a driveshaft and has an axle linked to the driveshaft. The power output apparatus basically includes: a power generation structure that receives a supply of fuel to generate electric power; a motor that inputs and outputs power; a change speed transmission mechanism that is arranged between a rotating shaft of the motor and the driveshaft to convert an input power with a changeover of a gear ratio and to transmit the converted power; an accumulator unit that transmits electric power to and from the power generation structure and the motor; a charge-discharge state detection unit that detects a charge-discharge state of the accumulator unit; a power demand setting unit that sets a power demand required for the driveshaft; and a control module that controls the power generation structure, the motor, and the change speed transmission mechanism during a changeover of the gear ratio of the change speed transmission mechanism to ensure output of a power substantially equivalent to the power demand to the driveshaft and to vary a changeover state of the gear ratio of the change speed transmission mechanism with a view to, in the event of a deviation of the detected charge-discharge state of the accumulator unit out of an allowable control range set as an allowed charge state range of the accumulator unit, making the charge-discharge state of the accumulator unit enter the allowable control range.

The motor vehicle of the invention is equipped with the power output apparatus having any of the arrangements described above and accordingly exerts the similar effects to those of the power output apparatus of the invention. For example, the motor vehicle of the invention effectively protects the accumulator unit from excessive power input and excessive power output.

The present invention is also directed to a drive system that drives a driveshaft. The drive system includes: a motor that inputs and outputs power; a change speed transmission mechanism that is arranged between a rotating shaft of the motor and the driveshaft to convert an input power with a changeover of a gear ratio and to transmit the converted power; an accumulator unit that transmits electric power to and from the motor; a charge-discharge state detection unit that detects a charge-discharge state of the accumulator unit; a power demand setting unit that sets a power demand required for the driveshaft; and a control module that controls the motor and the change speed transmission mechanism during a changeover of the gear ratio of the change speed transmission mechanism to ensure output of a power substantially equivalent to the power demand to the driveshaft and to vary a changeover state of the gear ratio of the change speed transmission mechanism with a view to, in the event of a deviation of the detected charge-discharge state of the accumulator unit out of an allowable control range set as an allowed charge state range of the accumulator unit, making the charge-discharge state of the accumulator unit enter the allowable control range.

The drive system of the invention controls the motor and the change speed transmission mechanism during a changeover of the gear ratio of the change speed transmission mechanism to ensure output of a power substantially equivalent to the required power demand to the driveshaft and to vary the changeover state of the gear ratio of the change speed transmission mechanism. The varied changeover state of the gear ratio aims, in the event of a deviation of the detected charge-discharge state of the accumulator unit out of the allowable control range set as the allowed charge state range of the accumulator unit, to make the charge-discharge state of the accumulator unit enter the allowable control range. The drive system of the invention accomplishes a changeover of the gear ratio of the change speed transmission mechanism, while keeping the charge-discharge state of the accumulator unit within the allowable control range. This arrangement effectively protects the accumulator unit from excessive power input and excessive power output.

The present invention is also directed to a control method of a power output apparatus. The power output apparatus includes: a power generation structure that receives a supply of fuel to generate electric power; a motor that inputs and outputs power; a change speed transmission mechanism that is arranged between a rotating shaft of the motor and the driveshaft to convert an input power with a changeover of a gear ratio and to transmit the converted power; and an accumulator unit that transmits electric power to and from the power generation structure and the motor. The control method including the step of controlling the power generation structure, the motor and the change speed transmission mechanism during a changeover of the gear ratio of the change speed transmission mechanism to ensure output of a power substantially equivalent to a required power demand to the driveshaft and to vary a changeover state of the gear ratio of the change speed transmission mechanism with a view to, in the event of a deviation of a detected charge-discharge state of the accumulator unit out of an allowable control range set as an allowed charge state range of the accumulator unit, making the charge-discharge state of the accumulator unit enter the allowable control range.

The control method of the power output apparatus of the invention controls the power generation structure, the motor and the change speed transmission mechanism during a changeover of the gear ratio of the change speed transmission mechanism to ensure output of a power substantially equivalent to the required power demand to the driveshaft and to vary the changeover state of the gear ratio of the change speed transmission mechanism. The varied changeover state of the gear ratio aims, in the event of a deviation of the detected charge-discharge state of the accumulator unit out of the allowable control range set as the allowed charge state range of the accumulator unit, to make the charge-discharge state of the accumulator unit enter the allowable control range. The drive system of the invention accomplishes a changeover of the gear ratio of the change speed transmission mechanism, while keeping the charge-discharge state of the accumulator unit within the allowable control range. This arrangement effectively protects the accumulator unit from excessive power input and excessive power output.

In one preferable embodiment of the control method of the invention, when the detected charge-discharge state of the accumulator unit is within the allowable control range, the control step varies a rotation speed of the motor at a first rate of change and accordingly changes over the gear ratio of the change speed transmission mechanism, and when the detected charge-discharge state of the accumulator unit is out of the allowable control range, the control step varies the rotation speed of the motor at a second rate of change, which is lower than the first rate of change, and accordingly changes over the gear ratio of the change speed transmission mechanism. In the event of a deviation of the charge-discharge state of the accumulator unit out of the allowable control range, the control method of this preferable embodiment reduces the rate of change in rotation speed of the motor, thus effectively protecting the accumulator unit from excessive power input and excessive power output. In another preferable embodiment of the control method of the invention, the change speed transmission mechanism changes an engagement state of at least one hydraulic-driven clutch to change over the gear ratio, and in the event of a deviation of the detected charge-discharge state of the accumulator unit out of the allowable control range, the control step regulates a state of a hydraulic pressure supply to the clutch and accordingly varies the changeover state of the gear ratio of the change speed transmission mechanism. The changeover state of the gear ratio of the change speed transmission mechanism can thus be varied adequately by regulating the state of the hydraulic pressure supply to the clutch. Here the terminology 'clutch' includes a conventional clutch for interconnecting two rotation systems, as well as a brake for fixing one rotation system to a non-rotation system, such as casing. In still another preferable embodiment of the control method of the invention, in the event of a deviation of the detected charge-discharge state of the accumulator unit out of the allowable control range, the control step regulates the state of the hydraulic pressure supply to the clutch based on the rotation speed of the motor to set the second rate of change to the rate of change of the rotation speed of the motor. This arrangement ensures the appropriate regulation of the rate of change in rotation speed of the motor.

BEST MODES OF CARRYING OUT THE INVENTION

Figure 1:
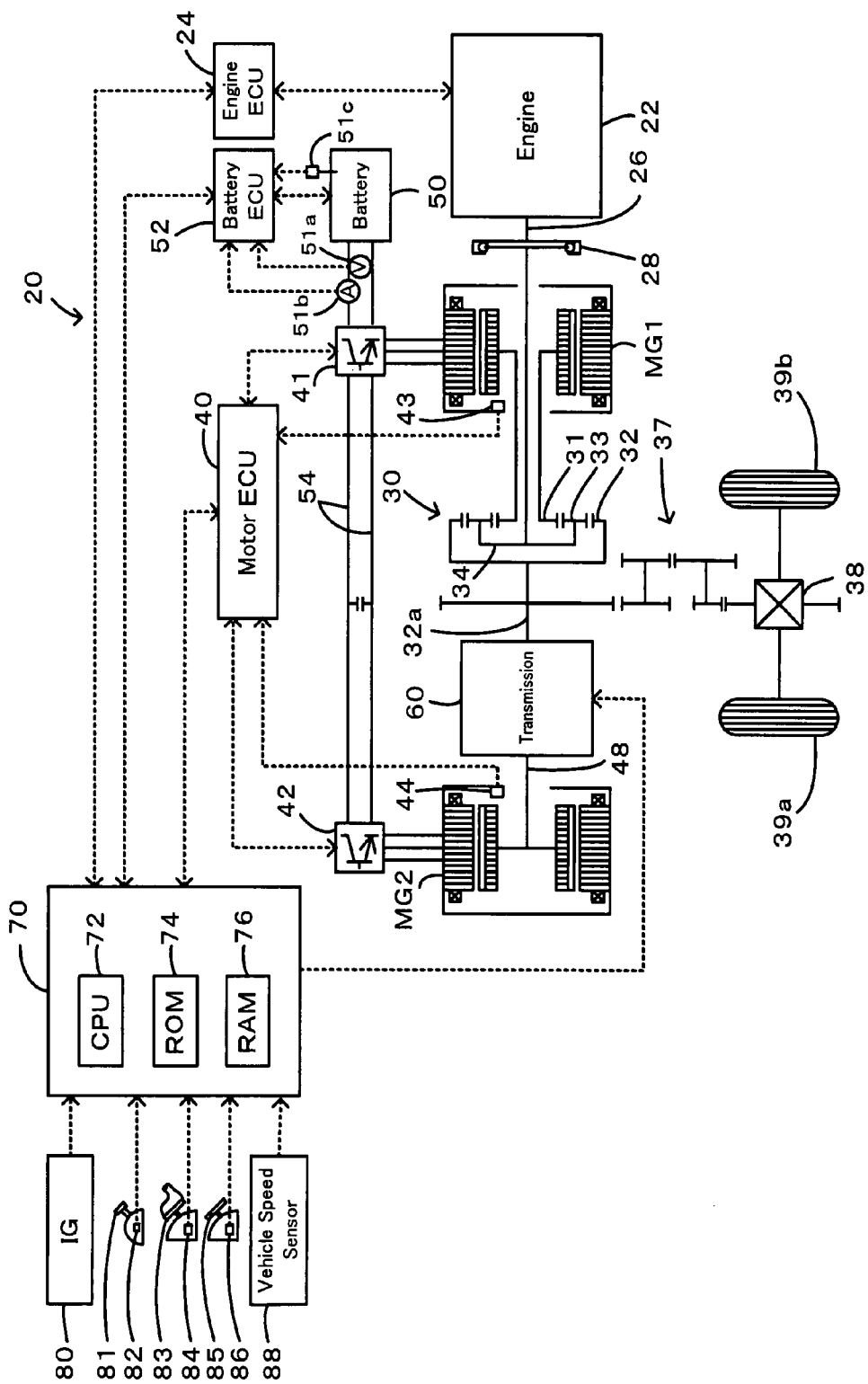
FIG. 1 schematically illustrates the configuration of a hybrid vehicle equipped with a power output apparatus in one embodiment of the invention.

One mode of carrying out the invention is discussed below as a preferred embodiment with reference to the accompanied drawings. FIG. 1 schematically illustrates the configuration of a hybrid vehicle 20 equipped with a power output apparatus in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is linked to the power distribution integration mechanism 30 and has power generation capability, a motor MG2 that is linked to the power distribution integration mechanism 30 via a transmission 60, and a hybrid electronic control unit 70 that controls the operations of the whole hybrid vehicle 20.

The engine 22 is an internal combustion engine consuming a hydrocarbon fuel, such as gasoline or light oil, to output power. The engine 22 is under control of an engine electronic control unit 24 (hereafter referred to as engine ECU 24). The engine ECU 24 receives diverse signals from various sensors that measure and detect the operating conditions of the engine 22, for example, a detection signal from a crank position sensor 23 attached to the crankshaft 26, and performs fuel injection control, ignition control, and air intake flow regulation in the engine 22. The engine ECU 24 establishes communication with the hybrid electronic control unit 70 to drive and control the engine 22 in response to control signals received from the hybrid electronic control unit 70 and to output data regarding the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 39a and 39b via the gear mechanism 37, and the differential gear 38 from ring gear shaft 32a.

The motors MG1 and MG2 are constructed as known synchronous motor generators that may be actuated both as a generator and as a motor. The motors MG1 and MG2 transmit electric powers to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2 and may be discharged to compensate for insufficient electric power generated by either of the motors MG1 and MG2. The battery 50 is neither charged nor discharged upon the balance of the input and output of electric powers between the motors MG1 and MG2. Both the motors MG1 and MG2 are driven and controlled by a motor electronic control unit 40 (hereafter, referred to as motor ECU 40). The motor ECU 40 receives signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from electric current sensors (not shown). The motor ECU 40 outputs switching control signals to the inverters 41 and 42. The motor ECU 40 executes a rotation speed computation routine (not shown) to compute rotation speeds Nm1 and Nm2 of the rotors in the motors MG1 and MG2 from the input signals from the rotational position detection sensors 43 and 44. The motor ECU 40 establishes communication with the hybrid electronic control unit 70 to drive and control the motors MG1 and MG2 in response to control signals received from the hybrid electronic control unit 70 and to output data regarding the operating conditions of the motors MG1 and MG2 to the hybrid electronic control unit 70 according to the requirements.

Figure 2:
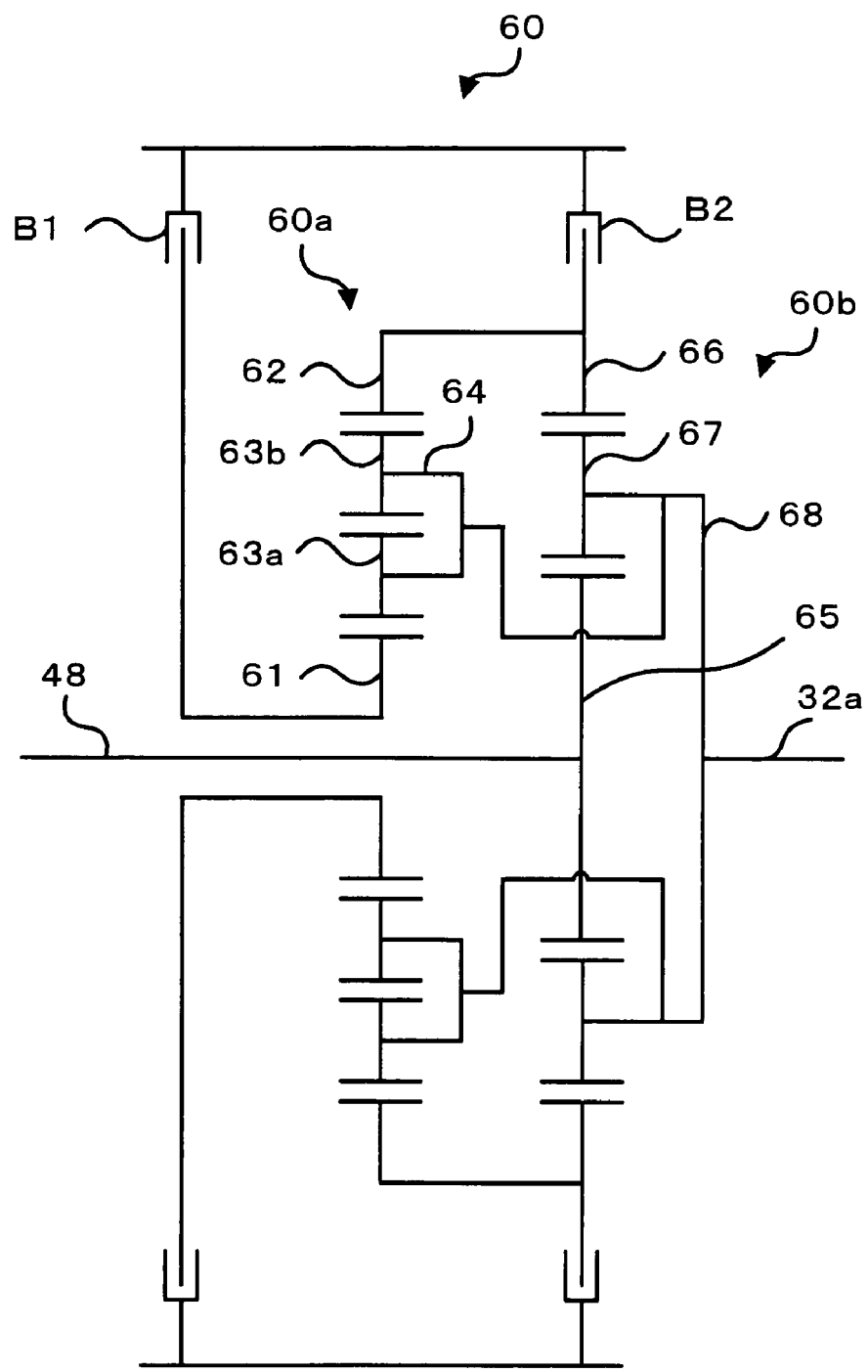
FIG. 2 shows the schematic structure of a transmission included in the hybrid vehicle of the embodiment.

The transmission 60 is designed to connect and disconnect a rotating shaft 48 of the motor MG2 with and from a ring gear shaft 32*a*. In the connection state, the transmission 60 reduces the rotation speed of the rotating shaft 48 of the motor MG2 at two different reduction gear ratios and transmits the reduced rotation speed to the ring gear shaft 32*a*. One typical structure of the transmission 60 is shown in FIG. 2. The transmission 60 shown in FIG. 2 has a double-pinion planetary gear mechanism 60*a*, a single-pinion planetary gear mechanism 60*b*, and two brakes B1 and B2. The double-pinion planetary gear mechanism 60*a* includes a sun gear 61 as an external gear, a ring gear 62 as an internal gear arranged concentrically with the sun gear 61, multiple first pinion gears 63*a* engaging with the sun gear 61, multiple second pinion gears 63*b* engaging with the multiple first pinion gears 63*a* and with the ring gear 62, and a carrier 64 holding the multiple first pinion gears 63*a* coupled with the multiple second pinion gears 63*b* to allow both their revolutions and their rotations on their axes. The engagement and the release of the brake B1 stop and allow the rotation of the sun gear 61. The single-pinion planetary gear mechanism 60*b* includes a sun gear 65 as an external gear, a ring gear 66 as an internal gear arranged concentrically with the sun gear 65, multiple pinion gears 67 engaging with the sun gear 65 and with the ring gear 66, and a carrier 68 holding the multiple pinion gears 67 to allow both their revolutions and their rotations on their axes. The sun gear 65 and the carrier 68 are respectively connected to the rotating shaft 48 of the motor MG2 and to the ring gear shaft 32*a*. The engagement and the release of the brake B2 stop and allow the rotation of the ring gear 66. The double-pinion planetary gear mechanism 60*a* and the single-pinion planetary gear mechanism 60*b* are coupled with each other via linkage of the respective ring gears 62 and 66 and linkage of the respective carriers 64 and 68. In the transmission 60, the combination of the released brakes B1 and B2 disconnects the rotating shaft 48 of the motor MG2 from the ring gear shaft 32*a*. The combination of the released brake B1 and the engaged brake B2 reduces the rotation of the rotating shaft 48 of the motor MG2 at a relatively high reduction gear ratio Ghi and transmits the reduced rotation to the ring gear shaft 32*a*. This state is expressed as Lo gear position. The combination of the engaged brake B1 and the released brake B2 reduces the rotation of the rotating shaft 48 of the motor MG2 at a relatively low reduction gear ratio Glo and transmits the reduced rotation to the ring gear shaft 32*a*. This state is expressed as Hi gear position. The combination of the engaged brakes B1 and B2 prohibits the rotations of the rotating shaft 48 and the ring gear shaft 32*a*.

Figure 3:
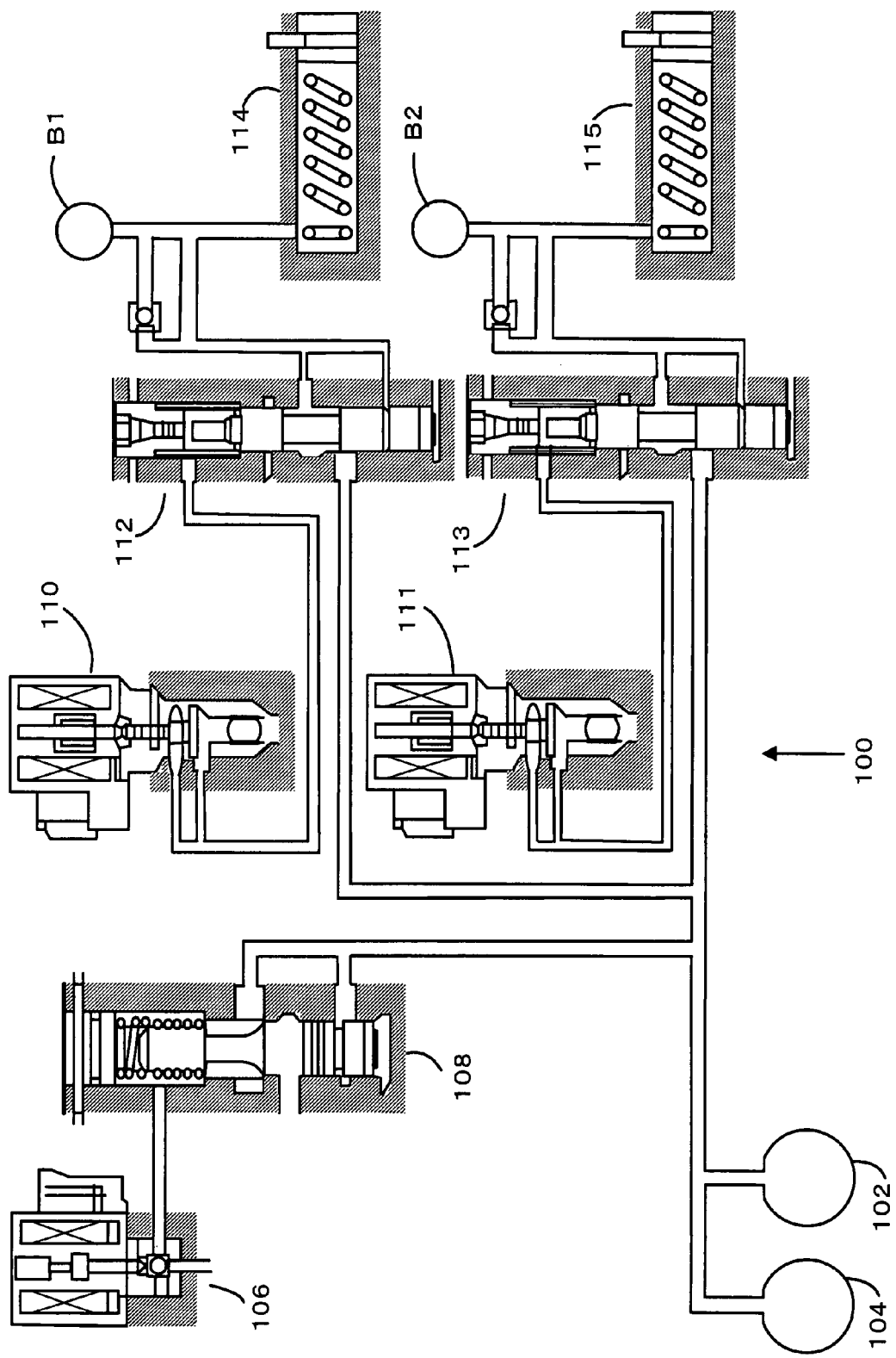
FIG. 3 shows the schematic structure of a hydraulic circuit included in the hybrid vehicle of the embodiment.

The brakes B1 and B2 are engaged and released by the function of a hydraulic circuit 100 shown in FIG. 3. The hydraulic circuit 100 includes a mechanical pump 102 driven by the rotation of the engine 22, an electric pump 104 having a built-in electric motor (not shown), a 3-way solenoid 106 and a pressure control valve 108 working in combination to regulate a line hydraulic pressure PL from the mechanical pump 102 or the electric pump 104, and linear solenoids 110 and 111, control valves 112 and 113, and accumulators 114 and 115 working in combination to utilize the line hydraulic pressure PL and regulate the engagement forces of the brakes B1 and B2. In the hydraulic circuit 100, the actuation of the 3-way solenoid valve 106 controls the open-close position of the pressure control valve 108 and accordingly regulates the line hydraulic pressure PL. The adjustment of the electric currents applied to the linear solenoids 110 and 111 controls the open-close positions of the control valves 112 and 113, which transmit the line hydraulic pressure PL to the brakes B1 and B2, and accordingly regulates the engagement forces of the brakes B1 and B2.

The battery 50 is under management and control of a battery electronic control unit 52 (hereafter referred to as battery ECU 52). The battery ECU 52 inputs various signals required for managing and controlling the battery 50, for example, an inter-terminal voltage Vb from a voltage sensor 51*a* located between terminals of the battery 50, a charge-discharge current Ib from an electric current sensor 51*b* located in the power line 54 connecting with an output terminal of the battery 50, and a battery temperature Tb from a temperature sensor 51*c* attached to the battery 50. The battery ECU 52 outputs data regarding the conditions of the battery 50 to the hybrid electronic control unit 70 by communication according to the requirements. For management and control of the battery 50, the battery ECU 52 computes a remaining charge level or current state of charge (SOC) of the battery 50 from an integration of the charge-discharge current Ib measured by the electric current sensor 51*b*.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88'. The hybrid electronic control unit 70 outputs, via its output port, driving signals to the electric motor for actuating the electric pump 104, to the 3-way solenoid 106, and to the linear solenoids 110 and 111. The hybrid electronic control unit 70 establishes communication with the engine ECU 24, the motor ECU 40, and the battery ECU 52 via its communication port to receive and send the diversity of control signals and data from and to the engine ECU 24, the motor ECU 40, and the battery ECU 52 as mentioned above.

The hybrid vehicle 20 of the embodiment thus constructed calculates a torque demand to be output to the ring gear shaft 32*a* functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32*a*. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32*a*. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 4:
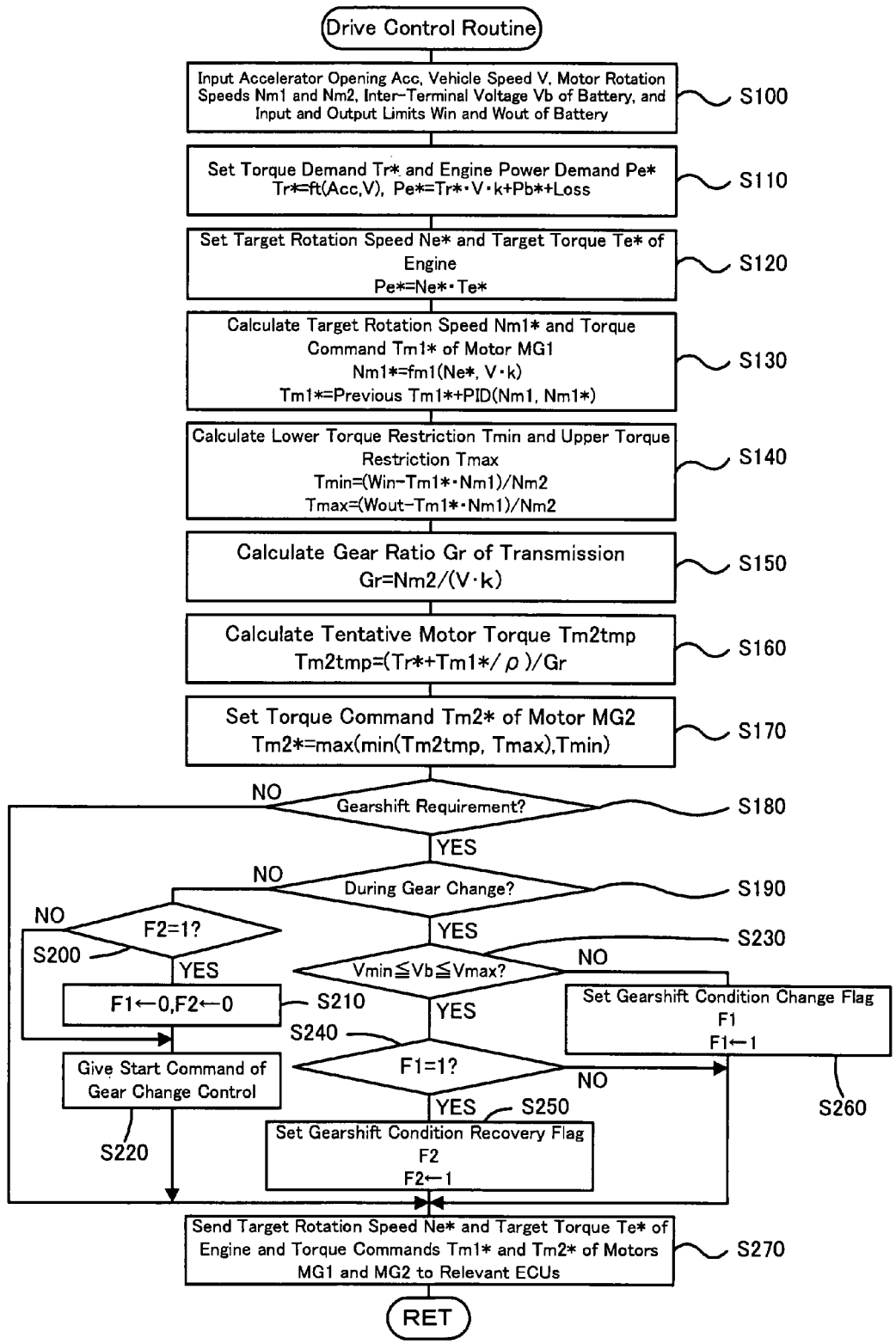
FIG. 4 is a flowchart showing a drive control routine executed by a hybrid electronic control unit included in the hybrid vehicle of the embodiment.

The description regards the operations of the hybrid vehicle 20 of the embodiment having the configuration discussed above. FIG. 4 is a flowchart showing a drive control routine executed by the hybrid electronic control unit 70 in the hybrid vehicle 20 of the embodiment. This drive control routine is performed repeatedly at preset time intervals, for example, at every several msec.

In the drive control routine of FIG. 4, the CPU 72 of the hybrid electronic control unit 70 first inputs various data required for control, that is, the accelerator opening Acc from the accelerator pedal position sensor 84, the vehicle speed V from the vehicle speed sensor 88, the rotation speeds Nm1 and Nm2 of the motors MG1 and MG2, the inter-terminal voltage Vb of the battery 50, and an input limit Win and an output limit Wout of the battery 50 (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The inter-terminal voltage Vb of the battery 50 is measured by the voltage sensor 51a and is received from the battery ECU 52 by communication. The input limit Win and the output limit Wout of the battery 50 are set based on the battery temperature Tb measured by the temperature sensor 51c and the state of charge SOC of the battery 50 and are received from the battery ECU 52 by communication.

Figure 5:
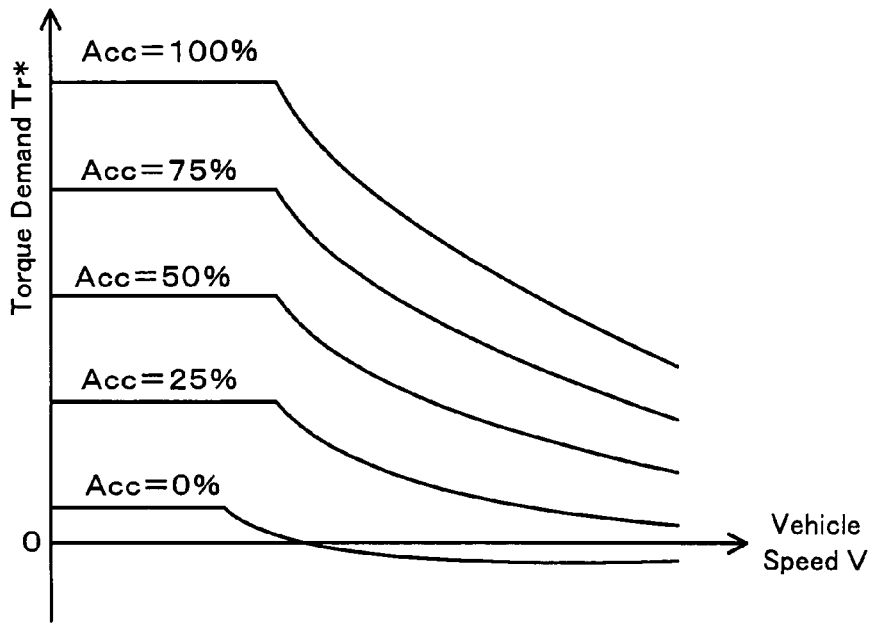
FIG. 5 shows one example of a torque demand setting map.

After the data input, the CPU 72 sets a torque demand Tr* to be output to the ring gear shaft 32a or a driveshaft linked with the drive wheels 39a and 39b and an engine power demand Pe* to be output from the engine 22, based on the input accelerator opening Acc and the input vehicle speed V (step S110). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from this torque demand setting map. One example of the torque demand setting map is shown in FIG. 5. The engine power demand Pe* is calculated as the sum of the product of the torque demand Tr* and a rotation speed Nr of the ring gear shaft 32a, a charge-discharge power demand Pb* to be charged into or discharged from the battery 50, and a potential loss. The rotation speed Nr of the ring gear shaft 32a is obtained by multiplying the vehicle speed V by a preset conversion factor k.

Figure 6:
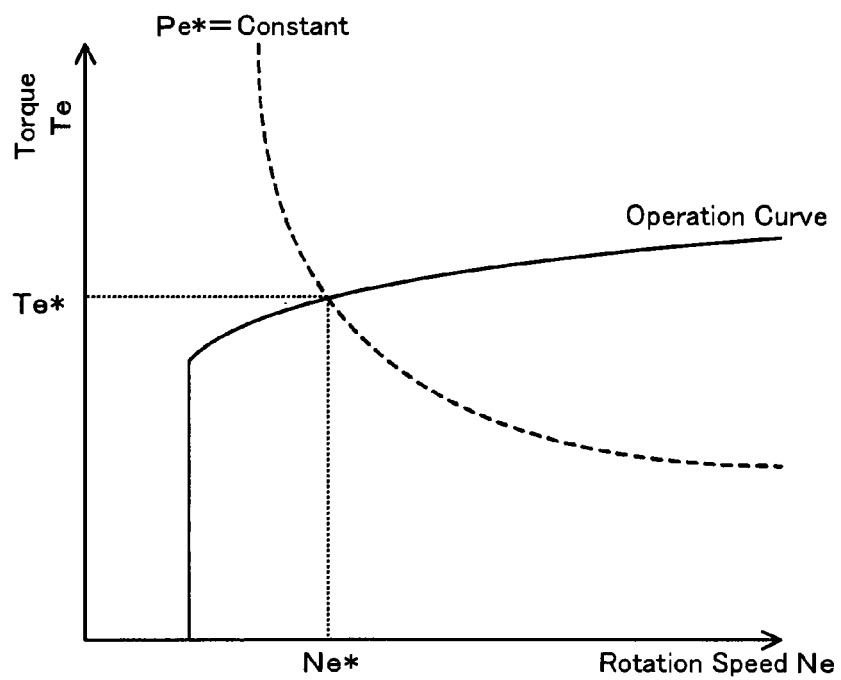
FIG. 6 shows an efficient operation curve of an engine to set a target rotation speed Ne* and a target torque Te*.

The CPU 72 subsequently sets a target rotation speed Ne* and a target torque Te* of the engine 22 corresponding to the engine power demand Pe* (step S120). The target rotation speed Ne* and the target torque Te* of the engine 22 are determined according to an efficient operation curve of ensuring efficient operations of the engine 22 and a curve of the engine power demand Pe*. FIG. 6 shows an efficient operation curve of the engine 22 to set the target rotation speed Ne* and the target torque Te*. As clearly shown in FIG. 6, the target rotation speed Ne* and the target torque Te* are given as an intersection of the efficient operation curve and a curve of constant engine power demand Pe*(=Ne*×Te*).

After setting the target rotation speed Ne* and the target torque Te* of the engine 22, the CPU 72 calculates a target rotation speed Nm1* of the motor MG1 from the target rotation speed Ne* of the engine 22, the rotation speed Nr (=V·k) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S130):

$$Nm1^* = Ne^* \cdot (1+\rho)/\rho - V \cdot k/\rho \qquad (1)$$

$$Tm1^* = \text{Previous } Tm1^* + k1(Nm1^* - Nm1) + k2\int(Nm1^* - Nm1)dt \qquad (2)$$

Figure 7:
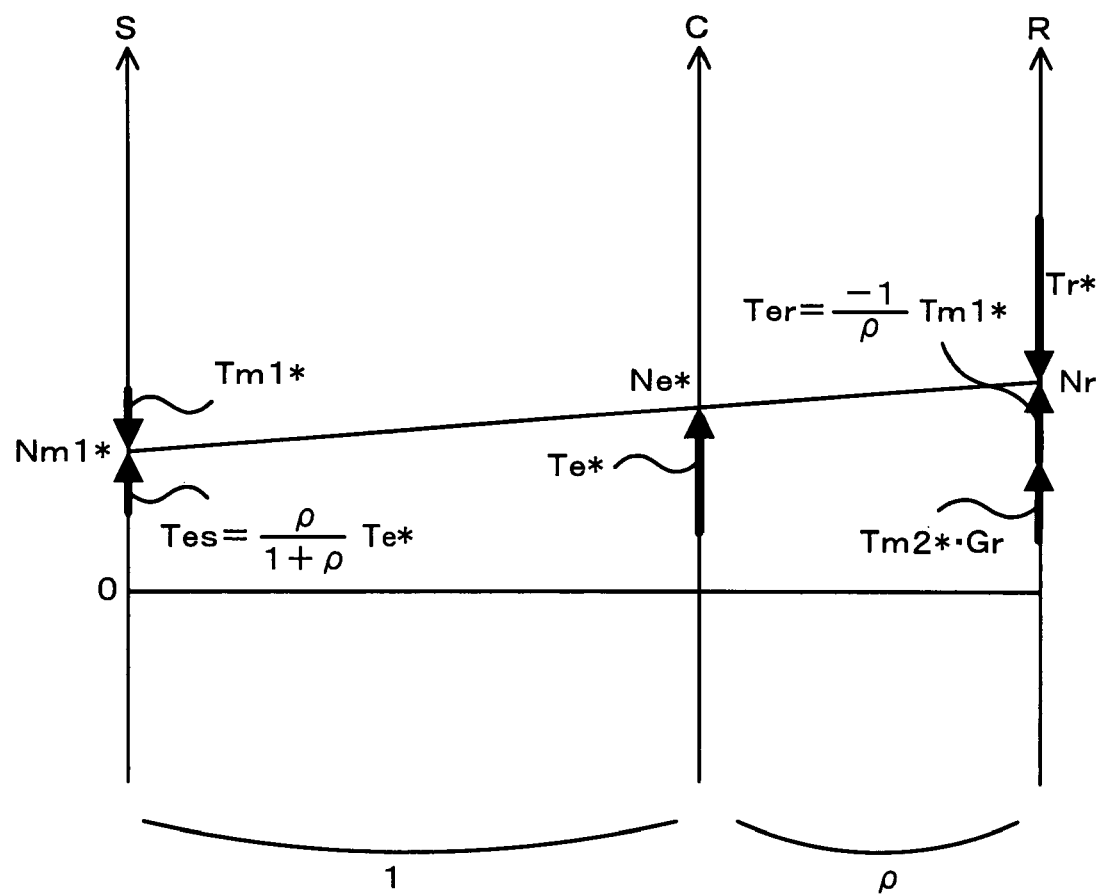
FIG. 7 is an alignment chart showing torque-rotation speed dynamics of respective rotational elements of a power distribution integration mechanism included in the hybrid vehicle of the embodiment.

Equation (1) is a dynamic relational expression of the rotational elements included in the power distribution integration mechanism 30. FIG. 7 is an alignment chart showing torque-rotation speed dynamics of the respective rotational elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32. Equation (1) is readily introduced from this alignment chart of FIG. 7. Two upward thick arrows on the axis 'R' respectively show a torque that is transmitted to the ring gear shaft 32a when the torque Te* is output from the engine 22 that is in steady operation at a specific drive point of the target rotation speed Ne* and the target torque Te*, and a torque that is applied to the ring gear shaft 32a via the transmission 60 when a torque Tm2* is output from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates a lower torque restriction Tmin and an upper torque restriction Tmax as minimum and maximum torques output from the motor MG2 according to Equations (3) and (4) given below (step S140):

$$T\text{min} = (Win - Tm1^* \cdot Nm1)/Nm2 \qquad (3)$$

$$T\text{max} = (Wout - Tm1^* \cdot Nm1)/Nm2 \qquad (4)$$

The lower torque restriction Tmin and the upper torque restriction Tmax are respectively given by dividing a difference between the input limit Win of the battery 50 and power consumption (power generation) of the motor MG1, which is the product of the torque command Tm1* and the current rotation speed Nm1 of the motor MG1, and a difference between the output limit Wout of the battery 50 and the power consumption (power generation) of the motor MG1 by the current rotation speed Nm2 of the motor MG2. The CPU 72 subsequently calculates a gear ratio Gr of the transmission 60 by dividing the current rotation speed Nm2 of the motor MG2 by the rotation speed Nr (=V·k) of the ring gear shaft 32a or the driveshaft (step S150). The CPU 72 then calculates a tentative motor torque Tm2tmp to be output from the motor MG2 from the torque demand Tr*, the torque command Tm1* of the motor MG1, the gear ratio ρ of the power distribution integration mechanism 30, and the gear ratio Gr of the transmission 60 according to Equation (5) given below (step S160):

$$Tm2tmp = (Tr^* + Tm1^*/\rho)/Gr \quad (5)$$

The CPU 72 limits the tentative motor torque Tm2*tmp* to the range between the calculated lower torque restriction Tmin and upper torque restriction Tmax to set a torque command Tm2* of the motor MG2 (step S170). Setting the torque command Tm2* of the motor MG2 in this manner restricts the torque demand Tr* to be output to the ring gear shaft 32*a* or the driveshaft within the range between the input limit Win and the output limit Wout of the battery 50. Equation (5) is readily introduced from the alignment chart of FIG. 7.

The CPU 72 then identifies whether there is a gearshift requirement for changing the gear ratio of the transmission 60 (step S180). In the hybrid vehicle 20 of this embodiment, the gearshift requirement of the transmission 60 is given at preset timings according to the torque demand Tr* and the vehicle speed V. In the absence of the gearshift requirement at step S180, the CPU 72 sends the target rotation speed Ne* and the target torque Te* of the engine 22 to the engine ECU 24 and the torque commands Tm1* and Tm2* of the motors MG1 and MG2 to the motor ECU 40 (step S270) and exits from this drive control routine. The engine ECU 24 receives the target rotation speed Ne* and the target torque Te* and performs fuel injection control and ignition control of the engine 22 to drive the engine 22 at a specified drive point of the target rotation speed Ne* and the target torque Te*. The motor ECU 40 receives the torque commands Tm1* and Tm2* and performs switching control of the switching elements included in the respective inverters 41 and 42 to drive the motor MG1 with the torque command Tm1* and the motor MG2 with the torque command Tm2*.

In the presence of the gearshift requirement at step S180, on the other hand, the CPU 72 subsequently determines whether the transmission 60 is during a gear change to change the gear ratio (step S190). Upon determination at step S190 that the transmission 60 is not during a gear change, the CPU 72 identifies the value of a gearshift condition recovery flag F2 (step S200). When the identified value of the gearshift condition recovery flag F2 is 1 at step S200, the CPU 72 resets both a gearshift condition change flag F1 and the gearshift condition recovery flag F2 to 0 (step S210) and gives a start command of gear change control to change the gear ratio of the transmission 60 (step S220). When the identified value of the gearshift condition recovery flag F2 is 0 at step S200, on the other hand, the CPU 72 immediately gives the start command of gear change control (step S220). After the processing of step S220, the CPU 72 sends the respective data to the relevant ECUs (step S270) and terminates the drive control routine. The gearshift condition change flag F1 and the gearshift condition recovery flag F2 will be described later in detail. In response to the start command of gear change control, the hybrid electronic control unit 70 executes a gear change control routine shown in the flowchart of FIG. 8, in parallel with the drive control routine of FIG. 4. The details of the gear change control will be described later with reference to the flowchart of FIG. 8.

Upon determination at step S190 that the transmission 60 is during a gear change, on the other hand, the inter-terminal voltage Vb of the battery 50 is compared with a lower threshold value Vbmin and an upper threshold value Vbmax (step S230). The lower threshold value Vbmin and the upper threshold value Vbmax are set equal to or close to an allowable upper limit voltage and a lower limit voltage of the battery 50 and depend upon the properties of the battery 50. In an upshift to change the gear ratio of the transmission 60 from the Lo gear position to the Hi gear position, the output torque Tm2 of the motor MG2 changes with some delay from a variation in rotation speed Nm2 of the motor MG2. This delayed change is ascribed to a delay in detection by the rotational position detection sensor 44, delays in computation by the hybrid electronic control unit 70 and by the motor ECU 40, and a delay in communication between the hybrid electronic control unit 70 and the motor ECU 40. A resulting decrease in power consumption by the motor MG2 may cause excessive power input into the battery 50. The comparison between the inter-terminal voltage Vb of the battery 50 and the upper threshold value Vbmax determines whether the charge-discharge state of the battery 50 is within an allowable control range of the battery 50. In a downshift to change the gear ratio of the transmission 60 from the Hi gear position to the Lo gear position, on the contrary to the upshift, the power consumption by the motor MG2 may increase and cause excessive power output from the battery 50. The comparison between the inter-terminal voltage Vb and the lower threshold value Vbmin determines whether the charge-discharge state of the battery 50 is within the allowable control range of the battery 50. When the inter-terminal voltage Vb of the battery 50 is lower than the lower threshold value Vbmin or is higher than the upper threshold value Vbmax at step S230, it is determined that the charge-discharge state of the battery 50 is out of the allowable control range of the battery 50. The CPU 72 then sets the gearshift condition change flag F1 equal to 1 (step S260) and executes the processing of step S270, before terminating the drive control routine. When the inter-terminal voltage Vb of the battery 50 is not lower than the lower threshold value Vbmin but is not higher than the upper threshold value Vbmax, that is, in a range between the lower threshold value Vbmin and the upper threshold value Vbmax at step S230, on the other hand, it is determined that the charge-discharge state of the battery 50 is within the allowable control range of the battery 50. The CPU 72 then identifies the value of the gearshift condition change flag F1 (step S240). When the identified value of the gearshift condition change flag F1 is 1 at step S240, the CPU 72 sets the gearshift condition recovery flag F2 equal to 1 (step S250) and executes the processing of step S270, before terminating the drive control routine. When the identified value of the gearshift condition change flag F1 is 0 at step S240, on the other hand, the CPU 72 immediately executes the processing of step S270 and terminates the drive control routine. Namely the gearshift condition change flag F1 is set equal to 1 in response to a decrease of the inter-terminal voltage Vb of the battery 50 below the lower threshold value Vbmin or in response to an increase of the inter-terminal voltage Vb above the upper threshold value Vbmax during a gear change. The gearshift condition recovery flag F2 is set equal to 1 in response to a subsequent increase or decrease of the inter-terminal voltage Vb to the range between the lower threshold value Vbmin and the upper threshold value Vbmax. On condition that the gearshift condition recovery flag F2 is equal to 1, the gearshift condition change flag F1 and the gearshift condition recovery flag F2 are both set equal to 0 in a next cycle of the gear change control.

Figure 8:
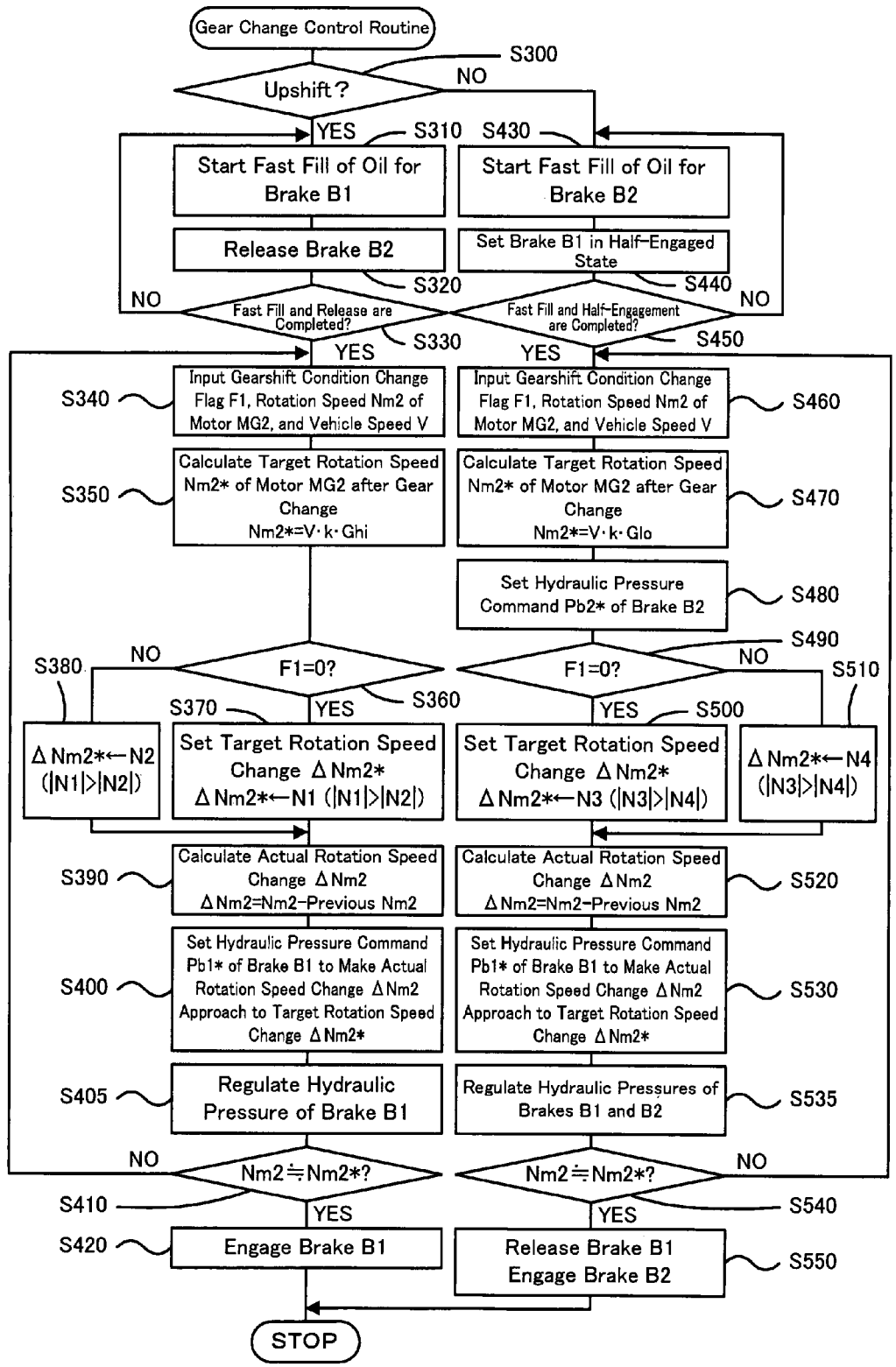
FIG. 8 is a flowchart showing a gear change control routine executed by the hybrid electronic control unit.

The description regards the details of the gear change control with reference to the flowchart of FIG. 8. In the gear change control routine of FIG. 8, the CPU 72 first identifies whether the gearshift requirement of the transmission 60 is an upshift requirement (step S300). Upon identification of an upshift requirement at step S300, the CPU 72 starts fast fill of oil to the brake B1 (step S310) and releases the brake B2 through drainage of the oil from the brake B2 (step S320). The fast fill represents a quick oil supply to an oil pack to fill in a space for contact with a frictional member. A concrete procedure of the fast fill actuates the linear solenoid 110 for the brake B1 at a duty ratio equal to or close to 100%. On conclusion of the fast fill for the brake B1 and the release of the brake B2 (step S330), the CPU 72 inputs the rotation speed Nm2 of the motor MG2, the vehicle speed V, and the gearshift condition change flag F1 set in the drive control routine of FIG. 4 (step S340). The CPU 72 then multiplies the rotation speed Nr (=V·k, V: vehicle speed, k: conversion factor) of the ring gear shaft 32a or the driveshaft by the gear ratio Ghi in the Hi gear position of the transmission 60 to calculate a target rotation speed Nm2* of the motor MG2 after a gear change (step S350) and identifies the value of the gearshift condition change flag F1 (step S360). When the identified value of the gearshift condition change flag F1 is 0, the CPU 72 sets a value N1 to a target rotation speed change ΔNm2* as a desired rate of change in rotation speed Nm2 of the motor MG2 during a change of the gear ratio of the transmission 60 (step S370). Here the value N1 depends upon the performances of the motor MG2 and the hydraulic circuit 100. The CPU 72 subtracts a previous rotation speed Nm2 (Previous Nm2) from the current rotation speed Nm2 of the motor MG2 to calculate an actual rotation speed change ΔNm2 as an actual rate of change in rotation speed Nm2 of the motor MG2 (step S390). The CPU 72 subsequently sets a hydraulic pressure command Pb1* of the brake B1 to make the actual rotation speed change ΔNm2 approach to the target rotation speed change ΔNm2*(step S400) and regulates the duty ratio of the linear solenoid 110 to supply a hydraulic pressure equivalent to the hydraulic pressure command Pb1* to the brake B1 (step S405). A concrete procedure of step S400 sets the hydraulic pressure command Pb1* of the brake B1 based on the actual rotation speed change ΔNm2 and the target rotation speed change ΔNm2* according to Equation (6) given below:

$$Pb1^* = \text{Previous } Pb1^* + PID(\Delta Nm2, \Delta Nm2^*) \quad (6)$$

Equation (6) is a function expression of feedback control with regard to a difference between the actual rotation speed change ΔNm2 and the target rotation speed change ΔNm2*. The function PID includes a proportional, an integral term, and a derivative term of the feedback control. Setting the hydraulic pressure command Pb1* of the brake B1 in this manner enables appropriate regulation of the rate of change in rotation speed Nm2 of the motor MG2. The rotation speed Nm2 of the motor MG2 is compared with the target rotation speed Nm2* after the gear change (step S410). When the rotation speed Nm2 of the motor MG2 is not sufficiently close to the target rotation speed Nm2* after the gear change at step S410, the gear change control goes back to step S340 and repeats the processing of steps S340 to S410. When the rotation speed Nm2 of the motor MG2 sufficiently approaches to the target rotation speed Nm2* after the gear change during the repeated execution of steps S340 to S410, the CPU 72 regulates the duty ratio of the linear solenoid 110 to engage the brake B1 (step S420) and terminates the gear change control routine. When the identified value of the gearshift condition change flag F1 is 1 at step S360, on the other hand, the CPU 72 sets a value N2 having a smaller absolute value than the value N1 to the target rotation speed change ΔNm2* (step S380) and executes the processing of and after step S390. In response to setting of the gearshift condition change flag F1 to 1 during an upshift operation, the target rotation speed change ΔNm2* is set to have a smaller absolute value than the absolute value of the target rotation speed change ΔNm2* under the gearshift condition change flag F1 equal to 0. Setting the smaller absolute value reduces the rate of change in rotation speed Nm2 of the motor MG2. The reduced rate of change in rotation speed Nm2 prevents a continuous decrease in power consumption of the motor MG2 induced by the delayed detection, the delayed computations, and the delayed communication and thus effectively protects the battery 50 from resulting excessive power input. When the inter-terminal voltage Vb of the battery 50 once exceeds the upper threshold value Vbmax and subsequently decreases to or below the upper threshold value Vbmax during a gear change in the drive control routine of FIG. 4, the gearshift condition change flag F1 is kept equal to 1 until start of a next gear change of the transmission 60. This control procedure desirably reduces the potential shock caused by the varying rate of change in rotation speed Nm2 of the motor MG2, compared with the procedure of resetting the gearshift condition change flag F1 to 0 in response to a subsequent decrease in inter-terminal voltage Vb of the battery 50 to or below the upper threshold value Vbmax, that is, compared with the procedure of returning the rate of change in rotation speed Nm2 of the motor MG2 to its previous level.

Upon identification of a non-upshift requirement but a downshift requirement at step S300, on the other hand, the CPU 72 starts fast fill of oil for the brake B2 (step S430) and sets the brake B1 in a half-engaged state through drainage of the oil from the brake B1 (step S440). On conclusion of the fast fill for the brake B2 and the half-engagement of the brake B1 (step S450), the CPU 72 inputs the rotation speed Nm2 of the motor MG2, the vehicle speed V, and the gearshift condition change flag F1 set in the drive control routine of FIG. 4 (step S460). The CPU 72 then calculates the target rotation speed Nm2* of the motor MG2 from the vehicle speed V, the conversion factor k, and the gear ratio Glo in the Lo gear position of the transmission 60 (Nm2*=V·k·Glo) (step S470), sets a hydraulic pressure command Pb2* of the brake B2 based on the rotation speed Nm2 of the motor MG2 and the calculated target rotation speed Nm2* after the gear change (step S480), and identifies the value of the gearshift condition change flag F1 (step S490). When the identified value of the gearshift condition change flag F1 is 0 at step S490, the CPU 72 sets a value N3 to the target rotation speed change ΔNm2* (step S500). The value N3 depends upon the performances of the motor MG2 and the hydraulic circuit 100. When the identified value of the gearshift condition change flag F1 is 1 at step S490, on the other hand, the CPU 72 sets a value N4 having a smaller absolute value than the value N3 to the target rotation speed change ΔNm2*(step S510). The CPU 72 calculates the actual rotation speed change ΔNm2 as a difference between the previous rotation speed Nm2 (Previous Nm2) and the current rotation speed Nm2 of the motor MG2 (step S520), sets the hydraulic pressure command Pb1* of the brake B1 according to Equation (6) given above to make the actual rotation speed change ΔNm2 approach to the target rotation speed change ΔNm2*(step S530), and regulates the duty ratios of the linear solenoids 110 and 111 to respectively supply hydraulic pressures equivalent to the hydraulic pressure commands Pb1* and Pb2* to the brakes B1 and B2 (step S535). The rotation speed Nm2 of the motor MG2 is compared with the target rotation speed Nm2* after the gear change (step S540). When the rotation speed Nm2 of the motor MG2 is not sufficiently close to the target rotation speed Nm2* after the gear change at step S540, the gear change control goes back to step S460 and repeats the processing of steps S460 to S540. When the rotation speed Nm2 of the motor MG2 sufficiently approaches to the target rotation speed Nm2* after the gear change during the repeated execution of steps S460 to S540, the CPU 72 regulates the duty ratio of the linear solenoid 111 to engage the brake B2 and simultaneously releases the brake B1 through drainage of the oil from the brake B1 (step S550) and terminates the gear change control routine. As in the case of an upshift operation described above, in response to setting of the gearshift condition change flag F1 to 1 during a downshift operation, the target rotation speed change ΔNm2* is set to have a smaller absolute value than the absolute value of the target rotation speed change ΔNm2* under the gearshift condition change flag F1 equal to 0. Setting the smaller absolute value reduces the rate of change in rotation speed Nm2 of the motor MG2. The reduced rate of change in rotation speed Nm2 prevents a continuous increase in power consumption of the motor MG2 induced by the delayed detection, the delayed computations, and the delayed communication and thus effectively protects the battery 50 from resulting excessive power output. When the inter-terminal voltage Vb of the battery 50 once decreases below the lower threshold value Vbmin and subsequently increases to or above the lower threshold value Vbmin during a gear change in the drive control routine of FIG. 4, the gearshift condition change flag F1 is kept equal to 1 until start of a next gear change of the transmission 60. This control procedure desirably reduces the potential shock caused by the varying rate of change in rotation speed Nm2 of the motor MG2, compared with the procedure of resetting the gearshift condition change flag F1 to 0 in response to a subsequent increase in inter-terminal voltage Vb of the battery 50 to or above the lower threshold value Vbmin, that is, compared with the procedure of returning the rate of change in rotation speed Nm2 of the motor MG2 to its previous level.

Figure 9:
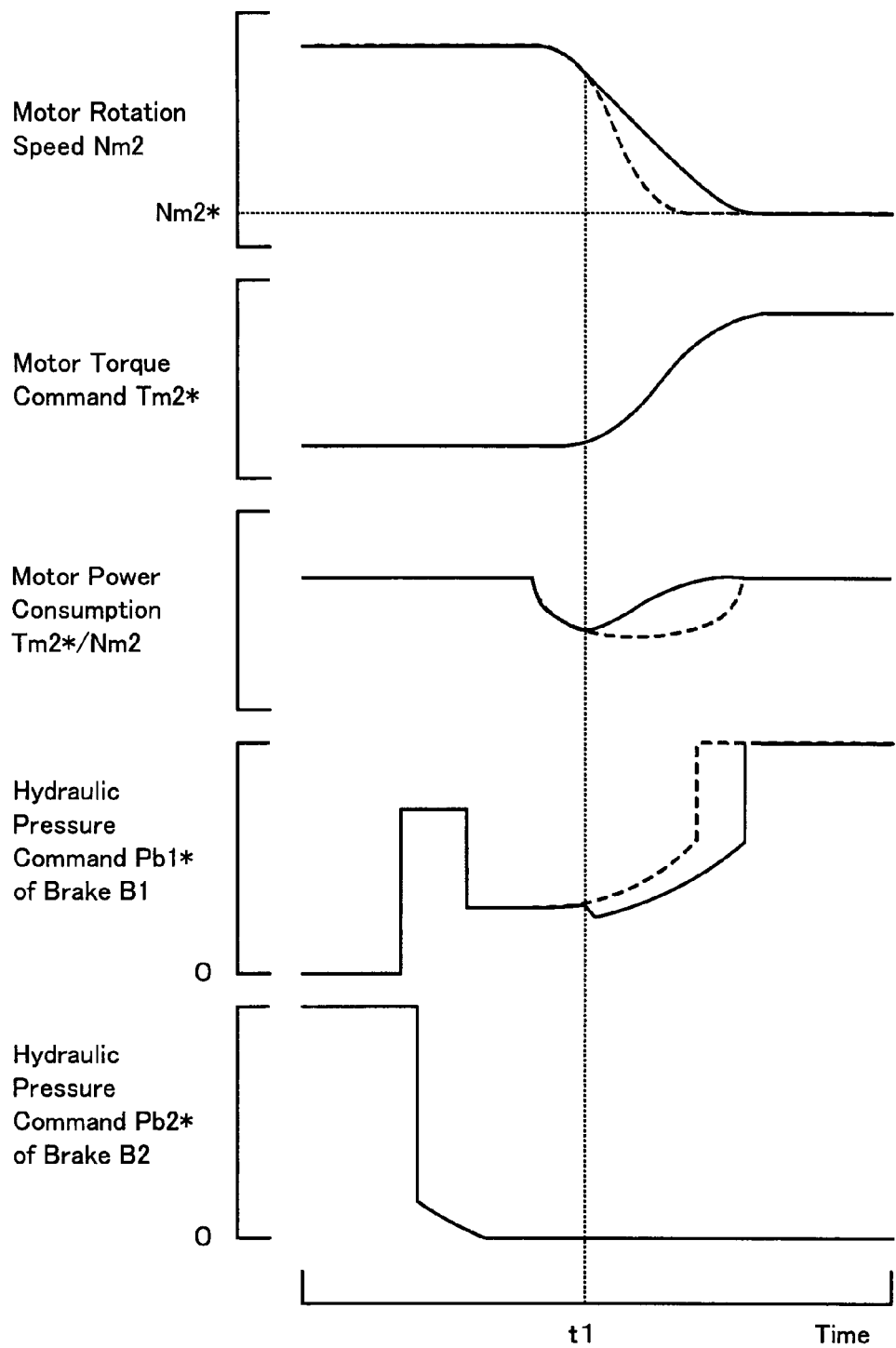
FIG. 9 shows time variations in rotation speed Nm2, torque command Tm2*, and power consumption (Tm2*·Nm2) of a motor MG2 and in hydraulic pressure commands Pb1* and Pb2* of brakes B1 and B2 during an upshift.
Figure 10:
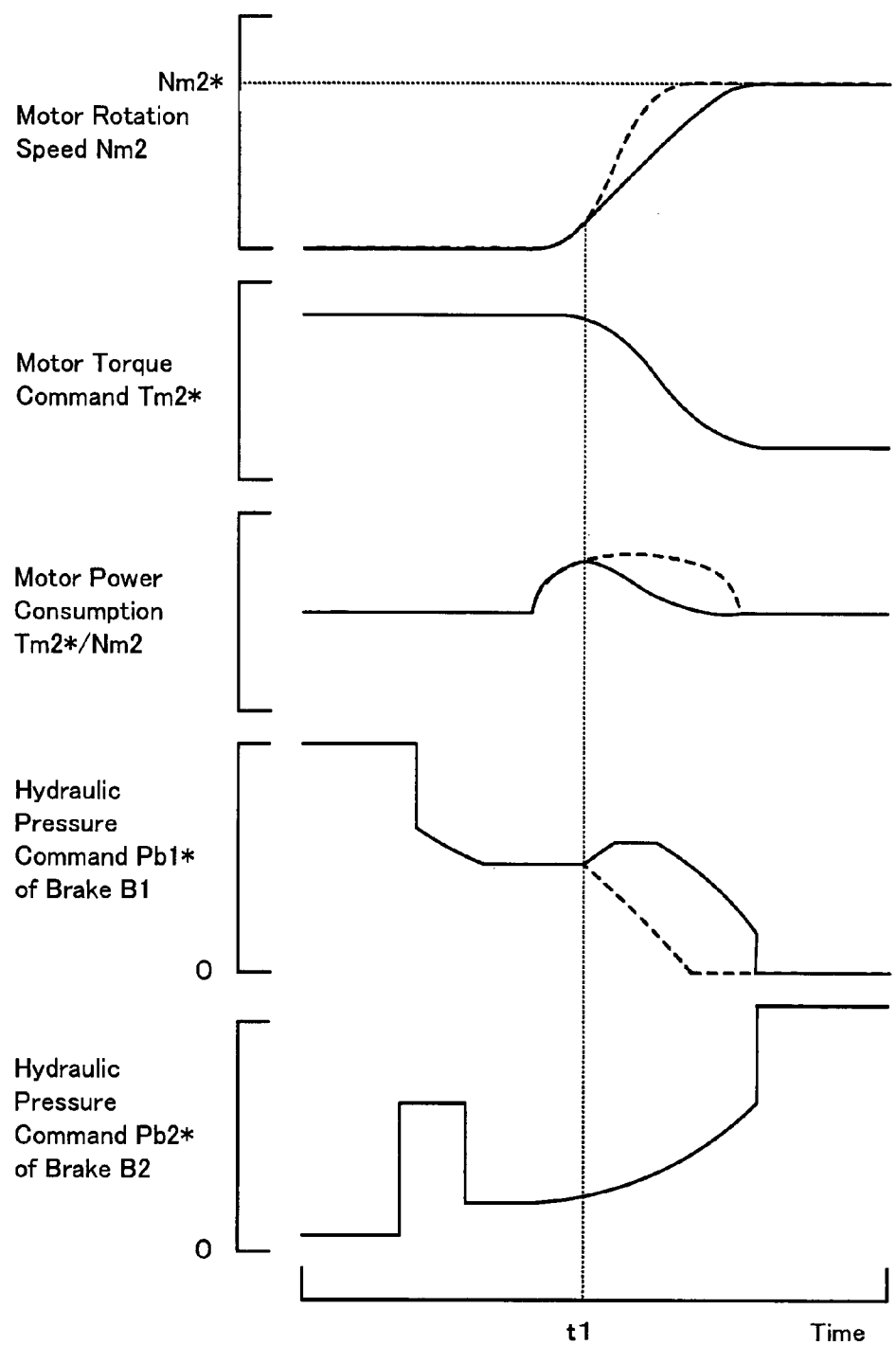
FIG. 10 shows time variations in rotation speed Nm2, torque command Tm2*, and power consumption (Tm2*·Nm2) of the motor MG2 and in hydraulic pressure commands Pb1* and Pb2* of the brakes B1 and B2 during a downshift.

FIG. 9 shows time variations in rotation speed Nm2, torque command Tm2*, and power consumption (Tm2*·Nm2) of the motor MG2 and in hydraulic pressure commands Pb1* and Pb2* of the brakes B1 and B2 during an upshift. FIG. 10 shows time variations in rotation speed Nm2, torque command Tm2*, and power consumption (Tm2*·Nm2) of the motor MG2 and in hydraulic pressure commands Pb1* and Pb2* of the brakes B1 and B2 during a downshift. In the time charts of FIGS. 9 and 10, the solid-line curves represent the time variations of the respective factors by the control of varying the rate of change in rotation speed Nm2 of the motor MG2 in response to a deviation of the charge-discharge state of the battery 50 out of the allowable control range at a time t1. For the purpose of comparison, the broken-line curves represent the time variations of the respective factors by the control of keeping the rate of change in rotation speed Nm2 of the motor MG2 unchanged even after the deviation of the charge-discharge state of the battery 50 out of the allowable control range at the time t1. As shown by the solid-line curves of FIG. 9 during an upshift, the control procedure of this embodiment decreases the hydraulic pressure command Pb1* of the brake B1 to be engaged and thereby reduces the rate of change in rotation speed Nm2 of the motor MG2 after the deviation of the charge-discharge state of the battery 50 out of the allowable control range. The reduced rate of change in rotation speed Nm2 prevents a continuous decrease in power consumption of the motor MG2 (Tm2*·Nm2) and thus effectively protects the battery 50 from excessive power input. As shown by the solid-line curves of FIG. 10 during a downshift, on the other hand, the control procedure of this embodiment increases the hydraulic pressure command Pb1* of the brake B1 to be released and thereby reduces the rate of change in rotation speed Nm2 of the motor MG2 after the deviation of the charge-discharge state of the battery 50 out of the allowable control range. The reduced rate of change in rotation speed Nm2 prevents a continuous increase in power consumption of the motor MG2 (Tm2*·Nm2) and thus effectively protects the battery 50 from excessive power output.

As described above, the hybrid vehicle 20 of the embodiment changes the hydraulic pressure command Pb1* of the brake B1 to reduce the rate of change in rotation speed Nm2 of the motor MG2, in response to a decrease in inter-terminal voltage Vb of the battery 50 below the lower threshold value Vbmin or in response to an increase in inter-terminal voltage Vb above the upper threshold value Vbmax during a gear change of the transmission 60. The reduced rate of change in rotation speed Nm2 prevents a continuous decrease or a continuous increase in power consumption of the motor MG2 induced by the delayed detection, the delayed computations, and the delayed communication and thus effectively protects the battery 50 from excessive power input or excessive power output. The reduced rate of change in rotation speed Nm2 is not returned to its previous level but is kept unchanged even when the inter-terminal voltage Vb of the battery 50 subsequently increase or decreases to the range between the lower threshold value Vbmin and the upper threshold value Vbmax. This arrangement desirably reduces the potential shock caused by the varying rate of change in rotation speed Nm2 of the motor MG2, compared with the procedure of returning the rate of change in rotation speed Nm2 of the motor MG2 to its previous level in response to a subsequent increase or decrease of the inter-terminal voltage Vb of the battery 50 to the range between the lower threshold value Vbmin and the upper threshold value Vbmax.

In the hybrid vehicle 20 of the embodiment described above, the drive control routine of FIG. 4 specifies whether the charge-discharge state of the battery 50 is in the allowable control range based on the measured inter-terminal voltage Vb of the battery 50 at step S230. The specification of the charge-discharge state of the battery 50 relative to the allowable control range may be based on the measured charge-discharge current Ib of the battery 50, in place of or in addition to the inter-terminal voltage Vb.

In the hybrid vehicle 20 of the embodiment described above, the drive control routine of FIG. 4 resets the gearshift condition change flag F1 to 0 only in response to start of a next gear change of the transmission 60 after completion of the current gear change of the transmission 60, as long as the inter-terminal voltage Vb of the battery 50 subsequently increases or decreases to the range between the lower threshold value Vbmin and the upper threshold value Vbmax after setting of the gearshift condition change flag F1 to 1. The timing of resetting the gearshift condition change flag F1 to 0 is, however, not restricted to this start timing of a next gear change of the transmission 60 but may be any suitable timing after completion of the current gear change of the transmission 60.

Figure 11:
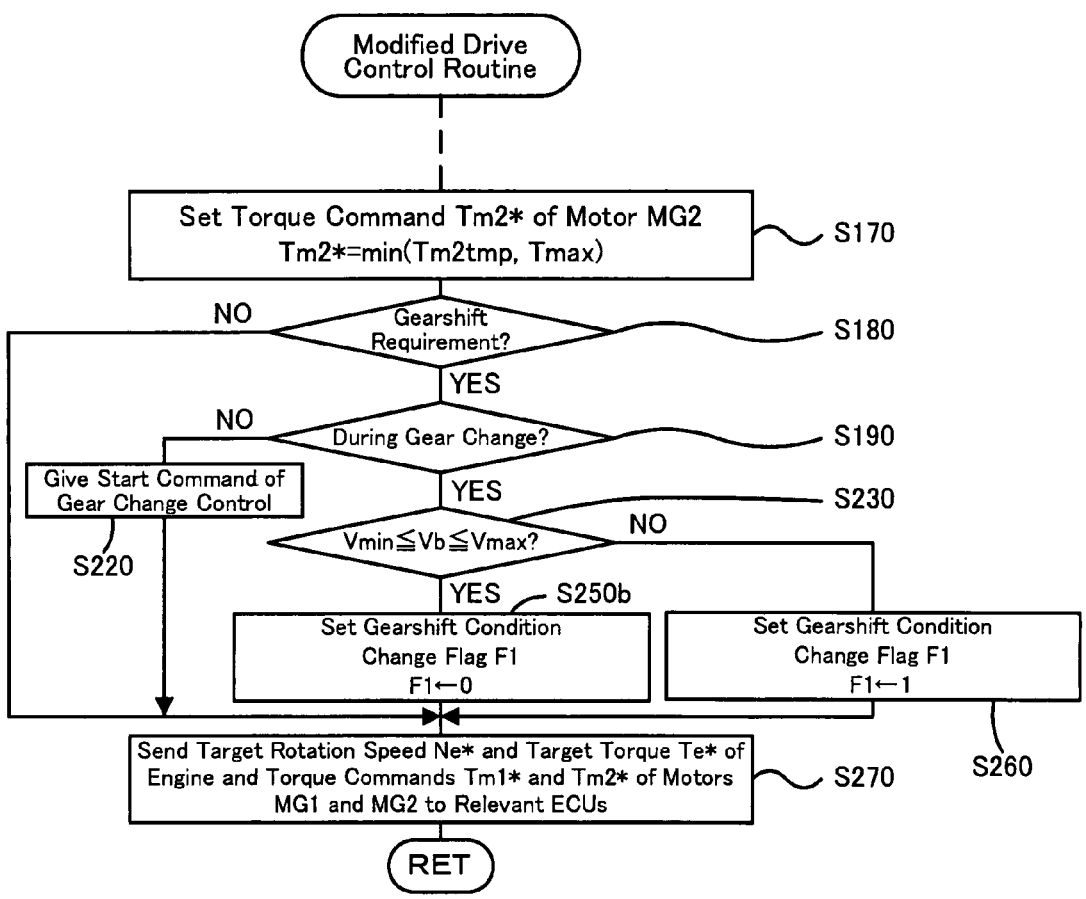
FIG. 11 is a flowchart showing a modified drive control routine in one modified example.

In the hybrid vehicle 20 of the embodiment described above, the drive control routine of FIG. 4 does not reset the gearshift condition change flag F1 to 0 but keeps the gearshift condition change flag F1 equal to 1 until start of a next gear change of the transmission 60 after completion of the current gear change of the transmission 60, even when the inter-terminal voltage Vb of the battery 50 subsequently increases or decreases to the range between the lower threshold value Vbmin and the upper threshold value Vbmax. One possible modification of the drive control routine may reset the gearshift condition change flag F1 to 0 in response to a subsequent increase or decrease of the inter-terminal voltage Vb of the battery 50 to the range between the lower threshold value Vbmin and the upper threshold value Vbmax. Part of the drive control routine with such modification is shown in the flowchart of FIG. 11. In the modified drive control routine of FIG.

11, in the presence of the gearshift requirement for a gear change of the transmission 60 at step S180, upon determination at step S190 that the transmission 60 is not during a gear change, the CPU 72 immediately gives the start command of gear change control (step S220). Upon determination at step S190 that the transmission 60 is during a gear change, on the other hand, the inter-terminal voltage Vb of the battery 50 is compared with the lower threshold value Vbmin and the upper threshold value Vbmax (step S230). When the inter-terminal voltage Vb of the battery 50 is in the range between the lower threshold value Vbmin and the upper threshold value Vbmax at step S230, the gearshift condition change flag F1 is reset to 0 (step S250b). When the inter-terminal voltage Vb of the battery 50 is lower than the lower threshold value Vbmin or higher than the upper threshold value Vbmax at step S230, on the other hand, the gearshift condition change flag F1 is set to 1 (step S260). The arrangement of this modified drive control routine varies the rate of change in rotation speed Nm2 of the motor MG2 according to the inter-terminal voltage Vb of the battery 50.

Figure 12:
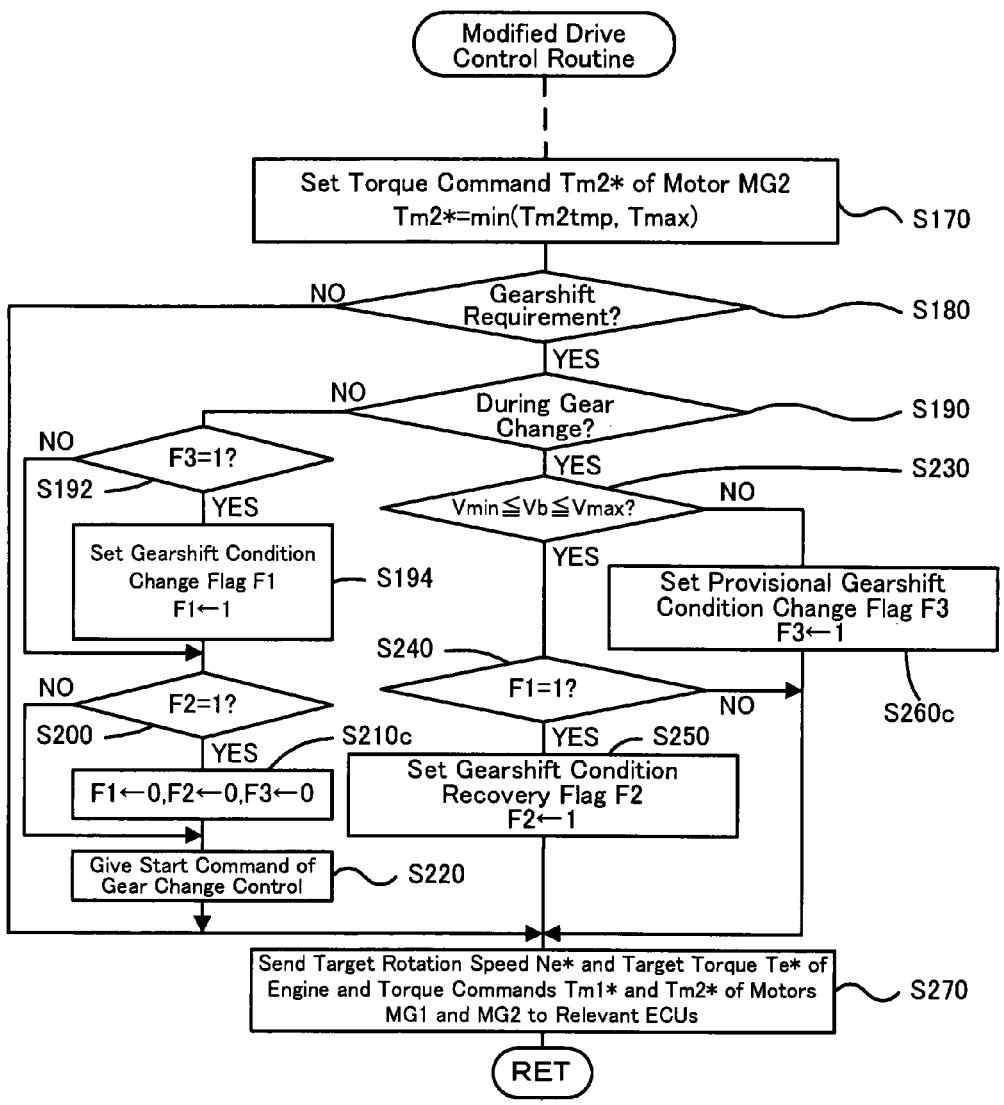
FIG. 12 is a flowchart showing another modified drive control routine in another modified example.

In the hybrid vehicle 20 of the embodiment described above, the drive control routine of FIG. 4 immediately sets the gearshift condition change flag F1 to 1 in response to a decrease in inter-terminal voltage Vb of the battery 50 below the lower threshold value Vbmin or in response to an increase in inter-terminal voltage Vb of the battery 50 above the upper threshold value Vbmax during a gear change. One possible modification of the drive control routine may set the gearshift condition change flag F1 to 1 in response to start of a next gear change of the transmission 60 after completion of the current gear change of the transmission 60. Part of the drive control routine with such modification is shown in the flowchart of FIG. 12. In the modified drive control routine of FIG. 12, in the presence of the gearshift requirement for a gear change of the transmission 60 at step S180, upon determination at step S190 that the transmission 60 is not during a gear change, the CPU 72 identifies the value of a provisional gearshift condition change flag F3 (step S192). When the identified value of the provisional gearshift condition change flag F3 is 1 at step S192, the modified drive control routine goes to step S200 after setting the gearshift condition change flag F1 to 1 (step S194). When the identified value of the provisional gearshift condition change flag F3 is 0 at step S192, on the other hand, the modified drive control routine directly goes to step S200. The provisional gearshift condition change flag F3 shows whether the charge-discharge state of the battery 50 is deviated from the allowable control range during a previous gear change. The provisional gearshift condition change flag F3 is initially set equal to 0 and is set to 1 at step S260c as described below. The CPU 72 subsequently identifies the value of the gearshift condition recovery flag F2 (step S200). When the identified value of the gearshift condition recovery flag F2 is 1 at step S200, the modified drive control routine resets all the gearshift condition change flag F1, the gearshift condition recovery flag F2, and the provisional gearshift condition change flag F3 to 0 (step S210c) and gives the start command of gear change control (step S220). When the identified value of the gearshift condition recovery flag F2 is 0 at step S200, on the other hand, the modified drive control routine immediately gives the start command of gear change control (step S220). Upon determination at step S190 that the transmission 60 is during a gear change, on the other hand, the inter-terminal voltage Vb of the battery 50 is compared with the lower threshold value Vbmin and the upper threshold value Vbmax (step S230). When the inter-terminal voltage Vb of the battery 50 is lower than the lower threshold value Vbmin or is higher than the upper threshold value Vbmax at step S230, the CPU 72 sets the provisional gearshift condition change flag F3 to 1 (step S260c). When the inter-terminal voltage Vb is between the lower threshold value Vbmin and the upper threshold value Vbmax at step S230, the CPU 72 identifies the value of the gearshift condition change flag F1 (step S240). When the identified value of the gearshift condition change flag F1 is 1 at step S240, the CPU 72 sets the gearshift condition recovery flag F2 equal to 1 (step S250). When the inter-terminal voltage Vb of the battery 50 decreases below the lower threshold value Vbmin or increases above the higher threshold value Vbmax during a gear change, this modified drive control routine sets the gearshift condition change flag F1 to 1 in response to start of a next gear change of the transmission 60 after completion of the current gear change of the transmission 60. This arrangement effectively reduces the potential shock caused by the varying rate of change in rotation speed Nm2 of the motor MG2 during a gear change of the transmission 60.

Figure 13:
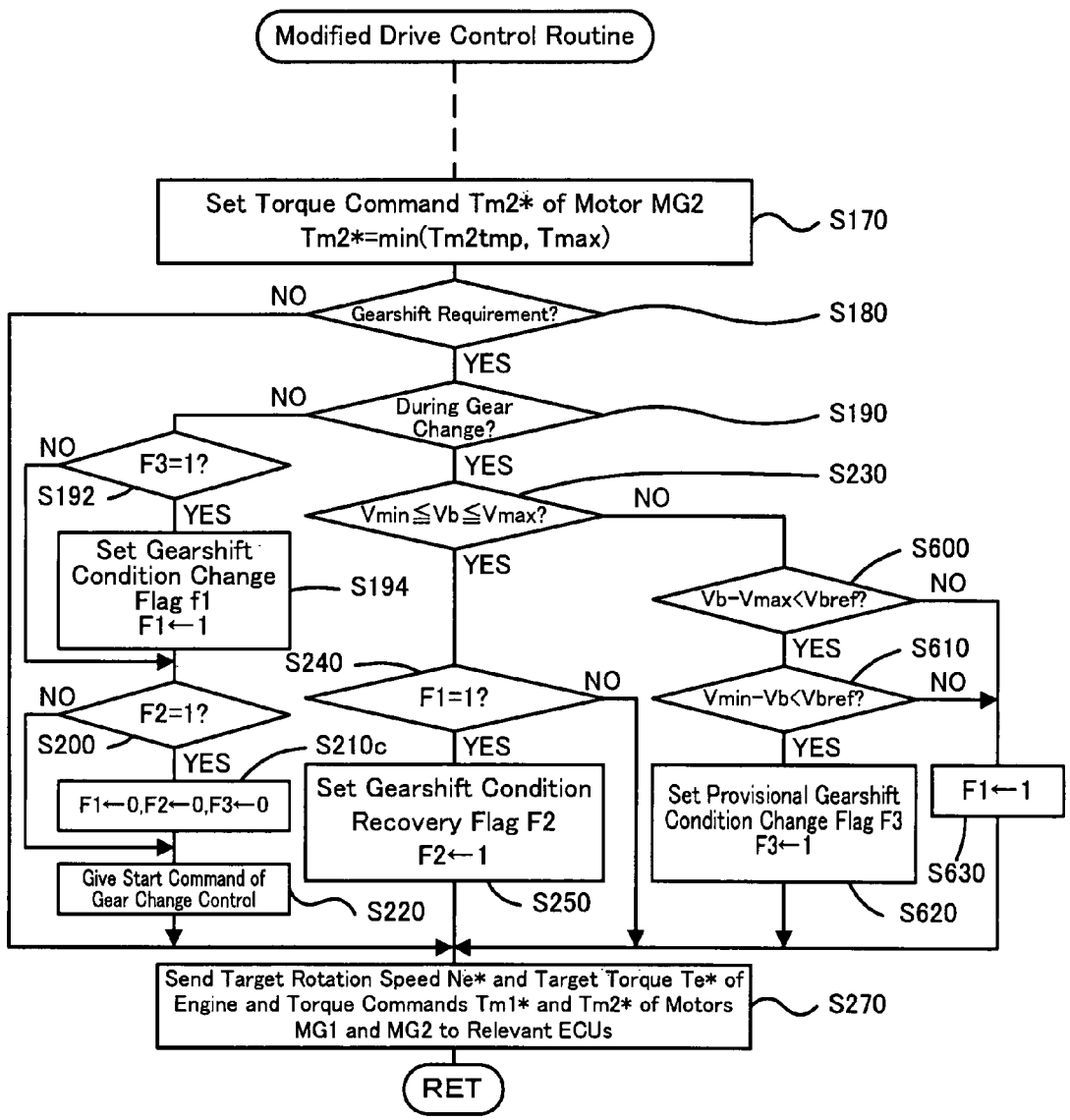
FIG. 13 is a flowchart showing still another modified drive control routine in still another modified example.

Another possible modification of the drive control routine may select the timing of setting the gearshift condition change flag F1 to 1 between the immediate timing after a decrease or increase of the inter-terminal voltage Vb of the battery 50 and the start timing of a next gear change of the transmission 60, based on the magnitude of the inter-terminal voltage Vb of the battery 50 that is lower than the lower threshold value Vbmin or is higher than the upper threshold value Vbmax. Part of the drive control routine with such modification is shown in the flowchart of FIG. 13. The modified drive control routine of FIG. 13 is similar to the modified drive control routine of FIG. 12, except that the processing of steps S600 to S630 replaces the processing of step S260c. In the modified drive control routine of FIG. 13, when the inter-terminal voltage Vb of the battery 50 decreases below the lower threshold value Vbmin or increases above the upper threshold value Vbmax during a gear change (steps S190 and S230), the CPU 72 subtracts the upper threshold value Vbmax from the inter-terminal voltage Vb of the battery 50 and compares the result of the subtraction with a reference value Vbref (step S600). The CPU 72 also subtracts the inter-terminal voltage Vb of the battery 50 from the lower threshold value Vbmin and compares the result of the subtraction with the reference value Vbref (step S610). The reference value Vbref is used as a criterion of specifying the degree of deviation of the charge-discharge state of the battery 50 from the allowable control range and depends upon the characteristics of the battery 50. When the result of the subtraction of the upper threshold value Vbmax from the inter-terminal voltage Vb of the battery 50 is not lower than the reference value Vbref at step S600 or when the result of the subtraction of the inter-terminal voltage Vb of the battery 50 from the lower threshold value Vbmin is not lower than the reference value Vbref at step S610, it is determined that the charge-discharge state of the battery 50 is significantly deviated from the allowable control range. The gearshift condition change flag F1 is then set equal to 1 (step S630). After setting the gearshift condition change flag F1 equal to 1, the gear change control routine of FIG. 8 reduces the rate of change in rotation speed Nm2 of the battery 50 and accordingly protects the battery 50 from excessive power input and excessive power output. When the result of the subtraction of the upper threshold value Vbmax from the inter-terminal voltage Vb of the battery 50 is lower than the reference value Vbref at step S600 and when the result of the subtraction of the inter-terminal voltage Vb of the battery 50 from the lower threshold value Vbmin is lower than the reference value Vbref at step S610, the provisional gearshift condition change flag F3 is set equal to 1 (step S620). Under condition that the provisional gearshift condition change flag F3 is set to 1, the gearshift condition change flag F1 is set equal to 1 at the start timing of a next gear change of the transmission 60 after completion of the current gear change of the transmission 60. This arrangement effectively reduces the potential shock caused by the varying rate of change in rotation speed Nm1 of the motor MG2 during a gear change.

In the hybrid vehicle 20 of the embodiment described above, the drive control routine of FIG. 4 sets the gearshift condition change flag F1 to 1 regardless of an upshift or a downshift of the transmission 60, when the comparison at step S230 shows a decrease of the inter-terminal voltage Vb of the battery 50 below the lower threshold value Vbmin or an increase of the inter-terminal voltage Vb above the upper threshold value Vbmax. One possible modification may set the gearshift condition change flag F1 to 1 only during an upshift of the transmission 60 or only during a downshift of the transmission 60. Namely the rate of change in rotation speed Nm2 of the motor MG2 may be varied according to the charge-discharge state of the batter 50 only during an upshift of the transmission 60 or only during a downshift of the transmission 60.

In the hybrid vehicle 20 of the embodiment described above, the gear change control routine of FIG. 8 sets the value N2 having the smaller absolute value than the value N1 to the target rotation speed change ΔNm2* during an upshift, while setting the value N4 having the smaller absolute value than the value N3 to the target rotation speed change ΔNm2* during a downshift. These values N2 and N4 may be set by taking into account the amount of power generation by the motor MG1.

In the hybrid vehicle 20 of the embodiment described above, the gear change control routine of FIG. 8 changes the hydraulic pressure command Pb1* of the brake B1 to reduce the rate of change in rotation speed Nm2 of the motor MG2, in response to setting of the gearshift condition change flag F1 to 1 during a gear change. The reduced rate of change in rotation speed Nm2 of the motor. MG2 may be attained by changing the hydraulic pressure command Pb2* of the brake B2 or by changing both the hydraulic pressure commands Pb1* and Pb2* of the brakes B1 and B2. The hybrid vehicle 20 of the embodiment changes the gear ratio of the transmission 60 in the half-engaged state of the brake B1 and in the released state of the brake B2. The gear ratio of the transmission 60 may be changed in the half-engaged state of both the brakes B1 and B2.

The hybrid vehicle 20 of the embodiment sets the hydraulic pressure commands Pb1* and Pb2* of the brakes B1 and B2, regardless of the rate of change in rotation speed Nm2 of the motor MG2 in a previous gear change of the transmission 60. One modified procedure may learn the rate of change in rotation speed Nm2 of the motor MG2, the engagement-release conditions of the brakes B1 and B2, and the hydraulic pressures supplied to the brakes B1 and B2 in a previous gear change of the transmission 60 and set the hydraulic pressure commands Pb1* and Pb2* of the brakes B1 and B2 based on the learning results.

The hybrid vehicle 20 of the embodiment uses the function expression of PID feedback control to set the hydraulic pressure command Pb1* of the brake B1. The feedback control is, however, not restricted to PID control but may be PI control without a derivative term or proportional control without an integral and a derivative term. Setting the hydraulic pressure command Pb1* of the brake B1 is not restricted to such feedback control but may be regulated by another control technique.

Figure 14:
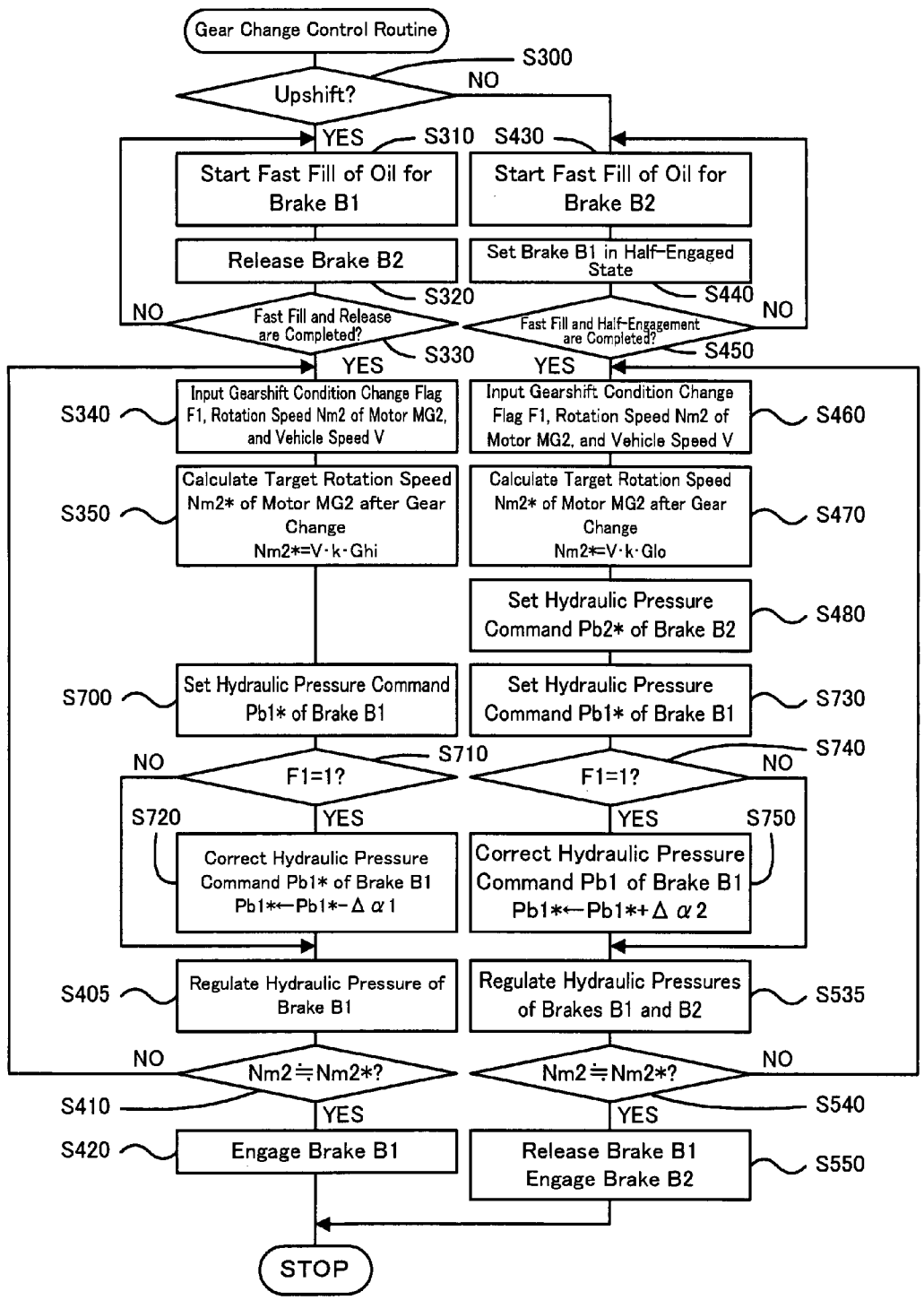
FIG. 14 is a flowchart showing a modified gear change control routine in another modified example.

In the hybrid vehicle 20 of the embodiment described above, the gear change control routine of FIG. 8 sets the hydraulic pressure command Pb1* of the brake B1 based on the actual rotation speed change ΔNm2 and the target rotation speed change ΔNm2*. The hydraulic pressure command Pb1* of the brake B1 may be set by another technique. A modified gear change control routine is shown in the flowchart of FIG. 14. In the modified gear change control routine of FIG. 14, upon identification of an upshift requirement (step S300), on conclusion of the fast fill for the brake B1 and the release of the brake B2 (steps S310 to S330), the CPU 72 inputs the rotation speed Nm2 of the motor MG2, the vehicle speed V, and the gearshift condition change flag F1 (step S340) and sets the target rotation speed Nm2* of the motor MG2 after the gear change (step S350). The CPU 72 then sets the hydraulic pressure command Pb1* of the brake B1 based on the rotation speed Nm2 of the motor MG2 and the target rotation speed Nm2* after the gear change (step S700). When the identified value of the gearshift condition change flag F1 is 1 (step S710), the hydraulic pressure command Pb1* of the brake B1 is corrected by subtracting a preset positive value Δα1 from the hydraulic pressure command Pb1* of the brake B1 (step S720). The modified gear change control routine subsequently executes the processing of and after step S405. Upon identification of a downshift requirement (step S300), on the other hand, on conclusion of the fast fill for the brake B2 and the half-engagement of the brake BE (steps S430 to S450), the CPU 72 inputs the rotation speed Nm2 of the motor MG2, the vehicle speed V, and the gearshift condition change flag F1 (step S460) and sets the target rotation speed Nm2* of the motor MG2 after the gear change (step S470). The CPU 72 then sets the hydraulic pressure commands Pb1* and Pb2* of the brakes B1 and B2 based on the rotation speed Nm2 of the motor MG2 and the target rotation speed Nm2* after the gear change (steps S480 and S730). When the identified value of the gearshift condition change flag F1 is 1 (step S740), the hydraulic pressure command Pb1* of the brake B1 is corrected by adding a preset positive value Δα2 to the hydraulic pressure command Pb1* of the brake B1 (step S750). The modified gear change control routine subsequently executes the processing of and after step S535. In response to setting of the gearshift condition change flag F1 to 1 during an upshift, the hydraulic pressure command Pb1* of the brake B1 to be engaged is decreased to reduce the rate of change in rotation speed Nm2 of the motor MG2. In response to setting of the gearshift condition change flag F1 to 1 during a downshift, on the contrary, the hydraulic pressure command Pb1* of the brake B1 to be released is increased to reduce the rate of change in rotation speed Nm2 of the motor MG2. This arrangement prevents a continuous decrease or a continuous increase in power consumption of the motor MG2 during a change of the gear ratio of the transmission 60 and thus effectively protects the battery 50 from excessive power input and excessive power output.

In the hybrid vehicle 20 of the embodiment described above, the hydraulic circuit 100 is used as the actuator of the brakes B1 and B2. The hydraulic-pressure actuator is, however, not essential but may be replaced by any other suitable actuator, for example, a motor actuator or a solenoid actuator.

Figure 15:
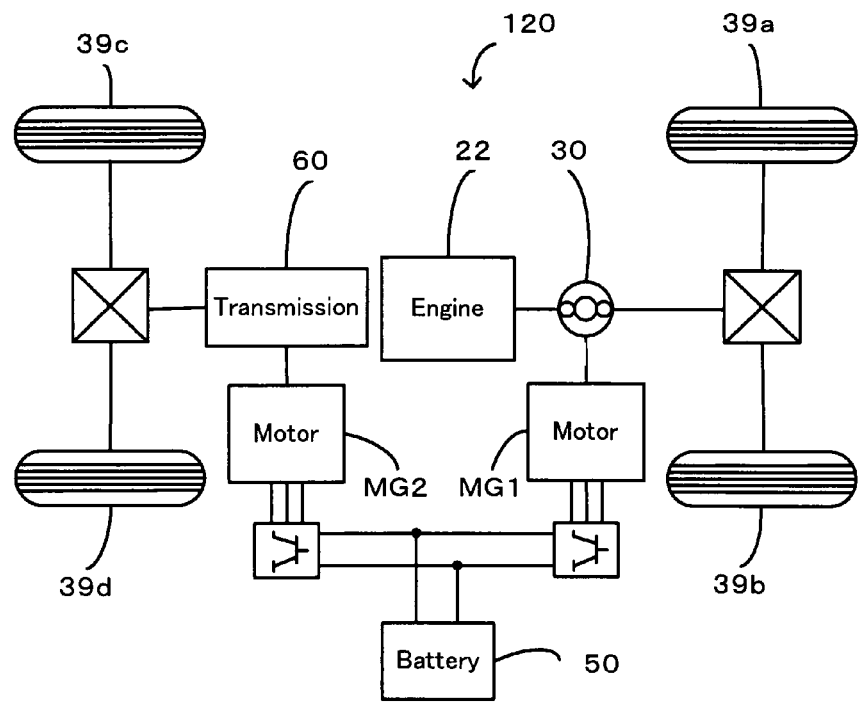
FIG. 15 schematically illustrates the configuration of another hybrid vehicle in one modified example.

In the hybrid vehicle 20 of the embodiment, the power of the motor MG2 goes through the gear change in the transmission 60 and is output to the ring gear shaft 32a or the driveshaft. The technique of the invention is also applicable to a hybrid vehicle 120 of one modified structure shown in FIG. 15. In the hybrid vehicle 120 of FIG. 15, the power of the motor MG2 goes through the gear change in the transmission 60 and is output to an axle linked to drive wheels 39c and 39d, which is different from an axle connected to the ring gear shaft 32a and linked to the drive wheels 39a and 39b.

Figure 16:
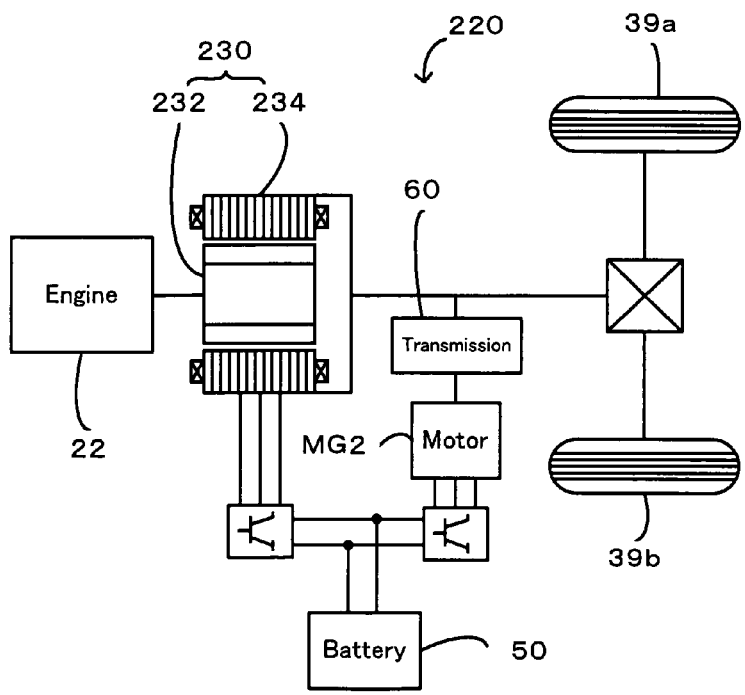
FIG. 16 schematically illustrates the configuration of still another hybrid vehicle in another modified example.

In the hybrid vehicle 20 of the embodiment, the power of the engine 22 is output via the power distribution integration mechanism 30 to the ring gear shaft 32a functioning as the drive shaft linked with the drive wheels 39a and 39b. In another possible modification of FIG. 16, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 39a, 39b and transmits part of the power output from the engine 22 to the drive shaft while converting the residual part of the power into electric power.

Figure 17:
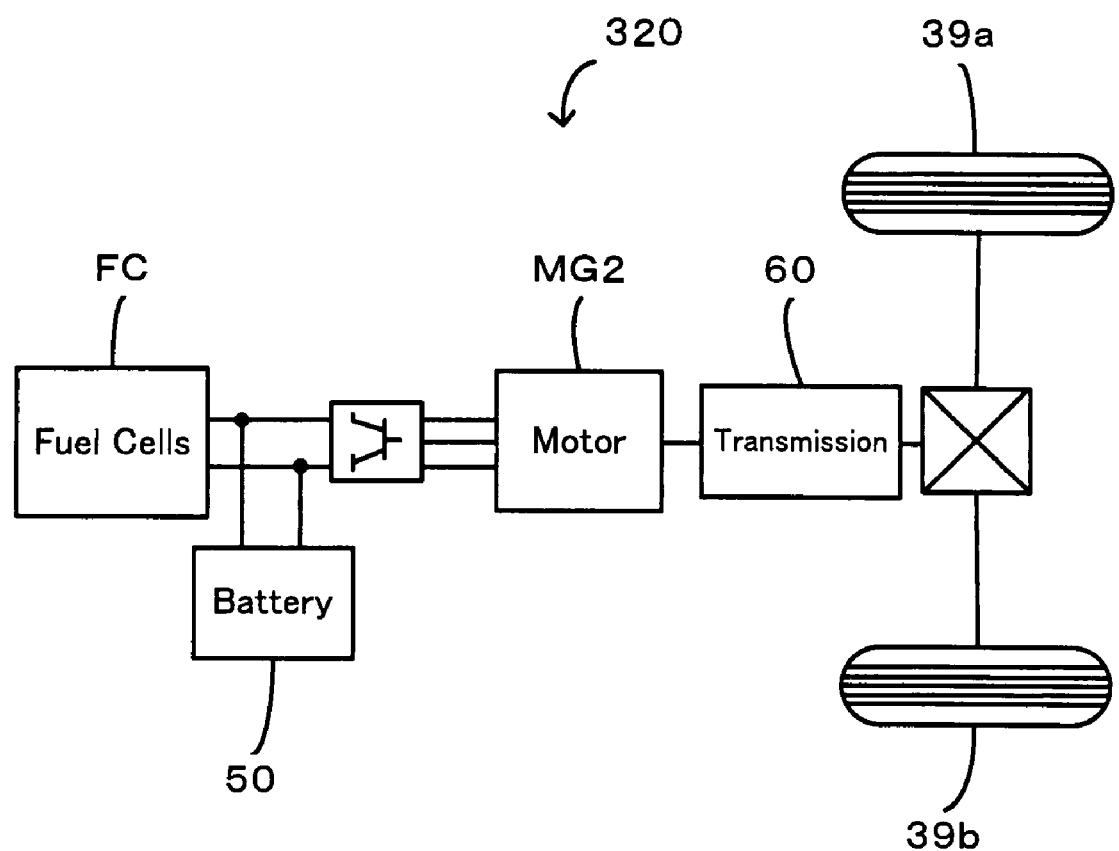
FIG. 17 schematically illustrates the configuration of a motor vehicle in another modified example.

The embodiment discussed above regards the hybrid vehicle 20 equipped with the power output apparatus, where the engine 22 and the motor MG1 are connected to the ring gear shaft 32a or the driveshaft via the power distribution integration mechanism 30 and the motor MG2 is connected to the driveshaft via the transmission 60. This configuration is, however, not restrictive in any sense, but the technique of the invention is applicable to any motor vehicle equipped with a power generation structure receiving a supply of fuel to generate electric power, in addition to the motor MG2. For example, the technique of the invention is applicable to a motor vehicle 320 equipped with fuel cells FC shown as a modified example in FIG. 17. The fuel cells FC of this modified structure may be replaced by the combination of an engine and a generator that consumes the output power of the engine to generate electric power. The technique of the invention may also be applied to a drive system that has no such a power generation structure but uses a transmission to convert the output power of the motor MG2 by a gear change and outputs the converted output power to the driveshaft.

The embodiment regards the hybrid vehicle equipped with the power output apparatus. The power output apparatus of the invention may be mounted on any of automobiles, other vehicles, aircraft, and ships and boats. The technique of the invention may also be actualized by a drive system including the power output apparatus or by a control method of the power output apparatus.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is preferably applicable to the manufacturing industries of power output apparatuses, drive systems, and motor vehicles.

The invention claimed is:

1. A power output apparatus that outputs power to a driveshaft, said power output apparatus comprising:
   a power generation structure that receives a supply of fuel to generate electric power;
   a motor that inputs and outputs power;
   a change speed transmission mechanism that is arranged between a rotating shaft of the motor and the driveshaft to convert an input power with a changeover of a gear ratio and to transmit the converted power;
   an accumulator unit that transmits electric power to and from the power generation structure and the motor;
   a charge-discharge state detection unit that detects a charge-discharge state of the accumulator unit;
   a power demand setting unit that sets a power demand required for the driveshaft; and
   a control module that controls the power generation structure, the motor, and the change speed transmission mechanism during a changeover of the gear ratio of the change speed transmission mechanism while outputting a power substantially equivalent to the power demand to the driveshaft and to vary a changeover state of the gear ratio of the change speed transmission mechanism with a view to, in the event of a deviation of the detected charge-discharge state of the accumulator unit out of an allowable control range set as an allowed charge state range of the accumulator unit, making the charge-discharge state of the accumulator unit enter the allowable control range.

2. A power output apparatus in accordance with claim 1, wherein the change speed transmission mechanism changes an engagement state of at least one hydraulic-driven clutch to change over the gear ratio, and
   in the event of a deviation of the detected charge-discharge state of the accumulator unit out of the allowable control range, said control module regulates a state of a hydraulic pressure supply to the clutch and accordingly varies the changeover state of the gear ratio of the change speed transmission mechanism.

3. A power output apparatus in accordance with claim 1, wherein when the detected charge-discharge state of the accumulator unit is deviated from the allowable control range and then reenters the allowable control range, said control module returns the changeover state of the gear ratio of the change speed transmission mechanism to a previous changeover state after completion of a current changeover of the gear ratio of the change speed transmission mechanism.

4. A power output apparatus in accordance with claim 1, wherein in the event of a deviation of the detected charge-discharge state of the accumulator unit out of the allowable control range, said control module varies the changeover state of the gear ratio of the change speed transmission mechanism at start of a next changeover of the gear ratio of the change speed transmission mechanism after completion of a current changeover of the gear ratio of the change speed transmission mechanism.

5. A power output apparatus in accordance with claim 1, wherein in the event of a deviation of the detected charge-discharge state of the accumulator unit out of the allowable control range, said control module sets a condition of varying the changeover state of the gear ratio of the change speed transmission mechanism based on the charge-discharge state of the accumulator unit.

6. A power output apparatus in accordance with claim 1, wherein the charge-discharge state detection unit detects the charge-discharge state of the accumulator unit, based on at least one of a voltage applied between output terminals of the accumulator unit and a flow of electric current supplied between the output terminals of the accumulator unit.

7. A power output apparatus in accordance with claim 1, wherein said control module controls the power generation structure, the motor, and the change speed transmission mechanism during a changeover of the gear ratio of the change speed transmission mechanism to decrease the rotation speed of the motor.

8. A power output apparatus in accordance with claim 1, wherein said control module controls the power generation structure, the motor, and the change speed transmission mechanism during a changeover of the gear ratio of the change speed transmission mechanism to increase the rotation speed of the motor.

9. A power output apparatus in accordance with claim 1, said power output apparatus further comprising:
a learning module that learns a variation in rotation speed of the motor at a timing of a changeover of the gear ratio of the change speed transmission mechanism,
wherein said control module refers to a result of the learning by the learning module and changes over the gear ratio of the change speed transmission mechanism based on the learning result.

10. A power output apparatus in accordance with claim 1, wherein in the event of a deviation of the detected charge-discharge state of the accumulator unit out of the allowable control range, said control module varies the changeover state of the gear ratio of the change speed transmission mechanism according to an amount of power generation by the power generation structure.

11. A power output apparatus in accordance with claim 1, wherein the power generation structure includes fuel cells.

12. A motor vehicle that is equipped with a power output apparatus in accordance with claim 1 and has an axle linked to the driveshaft.

13. A power output apparatus in accordance with claim 1, wherein when the detected charge-discharge state of the accumulator unit is within the allowable control range, said control module varies a rotation speed of the motor at a first rate of change and accordingly changes over the gear ratio of the change speed transmission mechanism, and
when the detected charge-discharge state of the accumulator unit is out of the allowable control range, said control module varies the rotation speed of the motor at a second rate of change, which is lower than the first rate of change, and accordingly changes over the gear ratio of the change speed transmission mechanism.

14. A power output apparatus in accordance with claim 13, wherein the change speed transmission mechanism changes an engagement state of at least one hydraulic-driven clutch to change over the gear ratio, and
in the event of a deviation of the detected charge-discharge state of the accumulator unit out of the allowable control range, said control module regulates a state of a hydraulic pressure supply to the clutch and accordingly varies the changeover state of the gear ratio of the change speed transmission mechanism.

15. A power output apparatus in accordance with claim 14, wherein in the event of a deviation of the detected charge-discharge state of the accumulator unit out of the allowable control range, said control module regulates the state of the hydraulic pressure supply to the clutch based on the rotation speed of the motor to set the second rate of change to the rate of change of the rotation speed of the motor.

16. A power output apparatus in accordance with claim 1, wherein the power generation structure includes: an internal combustion engine that is driven to output power; and an electric power-mechanical power input output mechanism that is connected with an output shaft of the internal combustion engine and with the driveshaft and outputs at least part of the power of the internal combustion engine to the driveshaft through input and output of electric power and mechanical power.

17. A power output apparatus in accordance with claim 16, wherein the electric power-mechanical power input output mechanism comprises: a three shaft-type power input output module that is linked to three shafts, the output shaft of the internal combustion engine, the driveshaft, and a rotating shaft, and automatically inputs and outputs power from and to a residual one shaft based on powers input from and output to any two shafts among the three shafts; and a generator that inputs and outputs power from and to the rotating shaft.

18. A power output apparatus in accordance with claim 16, wherein the electric power-mechanical power input output mechanism comprises a pair-rotor motor that has a first rotor connected to the output shaft of the internal combustion engine and a second rotor connected to the driveshaft and is driven to rotate through relative rotation of the first rotor to the second rotor.

19. A drive system that drives a driveshaft, said drive system comprising:
a motor that inputs and outputs power;
a change speed transmission mechanism that is arranged between a rotating shaft of the motor and the driveshaft to convert an input power with a changeover of a gear ratio and to transmit the converted power;
an accumulator unit that transmits electric power to and from the motor;
a charge-discharge state detection unit that detects a charge-discharge state of the accumulator unit;
a power demand setting unit that sets a power demand required for the driveshaft; and
a control module that controls the motor and the change speed transmission mechanism during a changeover of the gear ratio of the change speed transmission mechanism while outputting a power substantially equivalent to the power demand to the driveshaft and to vary a changeover state of the gear ratio of the change speed transmission mechanism with a view to, in the event of a deviation of the detected charge-discharge state of the accumulator unit out of an allowable control range set as an allowed charge state range of the accumulator unit, making the charge-discharge state of the accumulator unit enter the allowable control range.

20. A control method of a power output apparatus, said power output apparatus including a power generation structure that receives a supply of fuel to generate electric power; a motor that inputs and outputs power; a change speed transmission mechanism that is arranged between a rotating shaft of the motor and a driveshaft to convert an input power with a changeover of a gear ratio and to transmit the converted power; and an accumulator unit that transmits electric power to and from the power generation structure and the motor,
said control method comprising:
controlling the power generation structure, the motor, and the change speed transmission mechanism during a changeover of the gear ratio of the change speed transmission mechanism while outputting a power substantially equivalent to a required power demand to the driveshaft and to vary a changeover state of the gear ratio of the change speed transmission mechanism with a view to, in the event of a deviation of a detected charge-discharge state of the accumulator unit out of an allowable control range set as an allowed charge state range of the accumulator unit, making the charge-discharge state of the accumulator unit enter the allowable control range.

21. A control method in accordance with claim 20, wherein when the detected charge-discharge state of the accumulator unit is within the allowable control range, said control step varies a rotation speed of the motor at a first rate of change and accordingly changes over the gear ratio of the change speed transmission mechanism, and when the detected charge-discharge state of the accumulator unit is out of the allowable control range, said control step varies the rotation speed of the motor at a second rate of change, which is lower than the first rate of change, and accordingly changes over the gear ratio of the change speed transmission mechanism.

22. A control method in accordance with claim 21, wherein the change speed transmission mechanism changes an engagement state of at least one hydraulic-driven clutch to change over the gear ratio, and in the event of a deviation of the detected charge-discharge state of the accumulator unit out of the allowable control range, said control step regulates a state of a hydraulic pressure supply to the clutch and accordingly varies the changeover state of the gear ratio of the change speed transmission mechanism.

23. A control method in accordance with claim 22, wherein in the event of a deviation of the detected charge-discharge state of the accumulator unit out of the allowable control range, said control step regulates the state of the hydraulic pressure supply to the clutch based on the rotation speed of the motor to set the second rate of change to the rate of change of the rotation speed of the motor.

* * * * *